(12) United States Patent
Kwon et al.

(10) Patent No.: US 12,079,400 B2
(45) Date of Patent: Sep. 3, 2024

(54) ELECTRONIC DEVICE AND METHOD FOR CONTROLLING AIR POINTER OF STYLUS PEN IN ELECTRONIC DEVICE

(71) Applicant: Samsung Electronics Co., Ltd., Suwon-si (KR)

(72) Inventors: Hyunwoong Kwon, Suwon-si (KR); Banghyun Kwon, Suwon-si (KR); Inhyung Jung, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/187,349

(22) Filed: Mar. 21, 2023

(65) Prior Publication Data

US 2023/0221814 A1 Jul. 13, 2023

Related U.S. Application Data

(63) Continuation of application No. PCT/KR2021/017585, filed on Nov. 26, 2021.

(30) Foreign Application Priority Data

Nov. 27, 2020 (KR) .......................... 10-2020-0162110

(51) Int. Cl.
*G06F 3/0354* (2013.01)
*G06F 3/04817* (2022.01)
(Continued)

(52) U.S. Cl.
CPC ...... *G06F 3/03545* (2013.01); *G06F 3/04817* (2013.01); *G06F 3/04845* (2013.01);
(Continued)

(58) Field of Classification Search
CPC ............. G06F 3/03545; G06F 3/04817; G06F 3/04845; G06F 3/04842; G06F 3/0346;
(Continued)

(56) References Cited

U.S. PATENT DOCUMENTS

2003/0142144 A1* 7/2003 Balakrishnan .......... G06F 3/033
715/848
2008/0048980 A1* 2/2008 Love ..................... G06F 3/0346
345/158
(Continued)

FOREIGN PATENT DOCUMENTS

| CN | 104484061 A | 4/2015 |
|----|-------------|--------|
| JP | 2019-046458 A | 3/2019 |

(Continued)

OTHER PUBLICATIONS

International Search report and written opinion dated Feb. 25, 2022, issued in International Application No. PCT/KR2021/017585.

*Primary Examiner* — Tom V Sheng
(74) *Attorney, Agent, or Firm* — Jefferson IP Law, LLP

(57) ABSTRACT

An electronic device is provided. The electronic device includes a display and a processor, wherein the processor may be configured to confirm an air pointer initiation event of a stylus pen, display, on the display, an air pointer of the stylus pen on the basis of display rotation information and information of at least one application running on the electronic device, confirm, once a selection event is received from the stylus pen, first location information among a plurality of location information about the air pointer, calculated according to the motion of the selection event, confirm, on the basis of the information of the at least one application running on the electronic device, a function object set in an area of the display that comprises the first
(Continued)

location information, and perform a function of the function object, corresponding to the selection event.

15 Claims, 19 Drawing Sheets

(51) Int. Cl.
  *G06F 3/04845* (2022.01)
  *G06F 3/0346* (2013.01)
  *G06F 3/0484* (2022.01)
  *G06F 3/04842* (2022.01)

(52) U.S. Cl.
  CPC .......... *G06F 3/0346* (2013.01); *G06F 3/0484* (2013.01); *G06F 3/04842* (2013.01); *G06F 2200/1632* (2013.01); *G06F 2203/04806* (2013.01); *G06F 2203/04807* (2013.01)

(58) Field of Classification Search
  CPC ......... G06F 3/0484; G06F 2203/04806; G06F 2203/04807; G06F 2200/1632
  USPC ........................................................ 345/179
  See application file for complete search history.

(56) References Cited

U.S. PATENT DOCUMENTS

| | | | | |
|---|---|---|---|---|
| 2011/0169756 A1* | 7/2011 | Ogawa | ................ | G06F 3/03545 345/173 |
| 2013/0079062 A1* | 3/2013 | Sirpal | ................... | G06F 1/1616 455/566 |
| 2013/0321328 A1* | 12/2013 | Ahn | ..................... | G06F 3/03545 345/174 |
| 2014/0055427 A1 | 2/2014 | Kim et al. | | |
| 2014/0059499 A1* | 2/2014 | Kim | .................... | G06F 3/04812 715/862 |
| 2014/0354589 A1 | 12/2014 | Ahn | | |
| 2015/0015508 A1 | 1/2015 | Song et al. | | |
| 2016/0048320 A1 | 2/2016 | Han et al. | | |
| 2017/0262084 A1* | 9/2017 | Qiao | ....................... | H04W 4/80 |
| 2017/0322642 A1* | 11/2017 | Zhang | .................. | G06F 3/0484 |
| 2018/0033211 A1* | 2/2018 | Berman | .............. | G06F 3/04886 |
| 2018/0129313 A1 | 5/2018 | Westhues et al. | | |
| 2018/0136788 A1* | 5/2018 | He | .......... | G06F 3/042 |
| 2019/0042009 A1 | 2/2019 | Kumar et al. | | |
| 2019/0369755 A1* | 12/2019 | Roper | .................. | G06F 3/0481 |
| 2020/0103988 A1* | 4/2020 | Jeon | ....................... | G06F 3/046 |
| 2020/0201542 A1 | 6/2020 | Kumami et al. | | |
| 2020/0209992 A1* | 7/2020 | Kwak | ................. | G06F 3/03545 |
| 2020/0249774 A1 | 8/2020 | Jung et al. | | |

FOREIGN PATENT DOCUMENTS

| | | |
|---|---|---|
| KR | 10-2013-0136276 A | 12/2013 |
| KR | 10-2014-0026711 A | 3/2014 |
| KR | 10-2014-0030379 A | 3/2014 |
| KR | 10-2014-0142778 A | 12/2014 |
| KR | 10-2015-0007897 A | 1/2015 |
| KR | 10-2016-0020166 A | 2/2016 |
| KR | 10-2016-0081855 A | 7/2016 |
| KR | 10-1973634 B1 | 4/2019 |
| KR | 10-2019-0120730 A | 10/2019 |
| KR | 10-2020-0095972 A | 8/2020 |

* cited by examiner

ELECTRONIC DEVICE AND METHOD FOR CONTROLLING AIR POINTER OF STYLUS PEN IN ELECTRONIC DEVICE

CROSS-REFERENCE TO RELATED APPLICATION(S)

This application is a continuation application, claiming priority under § 365(c), of an International application No. PCT/KR2021/017585, filed on Nov. 26, 2021, which is based on and claims the benefit of a Korean patent application number 10-2020-0162110, filed on Nov. 27, 2020, in the Korean Intellectual Property Office, the disclosure of which is incorporated by reference herein in its entirety.

BACKGROUND

1. Field

The disclosure relates to an electronic device facilitating clear pointing by an air pointer of a stylus pen in the electronic device, and a method of controlling an air pointer of a stylus pen in an electronic device.

2. Description of Related Art

Electronic devices have been developed to receive various inputs from a user via a specified input device (e.g., a stylus pen) connected to the electronic devices via wireless communication. An electronic device may identify a position on the electronic device, designated by an input device (e.g., hereinafter, may be referred to as the term "stylus pen" for convenience of explanation) having a pen function, and perform a function corresponding to the position.

The stylus pen may include wireless communication, and provide various functions, such as pressure information of the stylus pen, battery state information, or information of an event caused by a button press, via a display of the electronic device linked with the stylus pen.

In addition, the stylus pen may provide an air gesture function, and the air gesture function may include a button press function and a gesture function.

In a case where the button press is generated from the stylus pen, a function mapped with a single press and/or a double press may be executed in the electronic device, and in a case where the gesture is generated from the stylus pen, a function mapped with left/right, up/down, and/or rotation may be executed in the electronic device.

For example, while a camera application is executed in the electronic device, in a case where a gesture operation, such as clockwise movement/counterclockwise movement, is generated from the stylus pen, the electronic device may perform a zoom in/out function. Moreover, when a single press on a button included in the stylus pen is detected, the electronic device may perform an image capturing (camera capture) function, and when a double press is detected, the electronic device may perform a function of changing a front/rear camera.

In addition, the stylus pen may provide, to the electronic device, an air pointer moving according to the movement of the pen, such as a pointer displayed using a normal mouse, and the air pointer may be differently displayed according to the type of application being executed in the electronic device, or the type of an object included in an application being executed.

The above information is presented as background information only to assist with an understanding of the disclosure. No determination has been made, and no assertion is made, as to whether any of the above might be applicable as prior art with regard to the disclosure.

SUMMARY

Delicate pointing by an air pointer displayed on a display of an electronic device while moving according to the movement of a stylus pen is not as easy as that by a normal mouse. In addition, in a case where a button included in the stylus pen is pressed to select an object pointed by the air pointing on the display of the electronic device, the stylus pen is moved due to an operation of pressing the button and thus the position of the air pointer is changed, so that clear pointing fails.

Aspects of the disclosure are to address at least the above-mentioned problems and/or disadvantages and to provide at least the advantages described below. Accordingly, an aspect of the disclosure is to provide an electronic device facilitating clear pointing by an air pointer of a stylus pen in the electronic device, and a method of controlling an air pointer of a stylus pen in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display and a processor, wherein the processor is configured to identify an air pointer initiation event of a stylus pen, display an air pointer of the stylus pen on a display, based on rotation information of the display and information of at least one application being executed in the electric device, identify first position information among multiple pieces of position information for the air pointer, which are calculated according to an operation of a selection event, in case that the selection event is received from the stylus pen, and identify a function object configured in an area including the first position information on the display, based on the information of the at least one application being executed in the electric device, and perform a function of the a function object corresponding to the selection event.

In accordance with another aspect of the disclosure, a method of controlling an air pointer of a stylus pen in an electronic device is provided. The method includes identifying an air pointer initiation event of a stylus pen, displaying an air pointer of the stylus pen on a display, based on rotation information of the display and information of at least one application being executed in the electric device, identifying first position information among multiple pieces of position information for the air pointer, which are calculated according to an operation of a selection event, in case that the selection event is received from the stylus pen, identifying a function object configured in an area including the first position information on the display, based on the information of the at least one application being executed in the electric device, and performing a function of the a function object corresponding to the selection event.

According to various embodiments, an air pointer moving according to the movement of a stylus pen is used to more easily and clearly point a desired object among function objects included in an application being executed on the display. In addition, the problem wherein, when a button event relating to a press of a button included in a stylus pen is received, the position of the air pointer is changed to correspond to the movement of the stylus pen and thus the position of pointing is changed, may be solved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
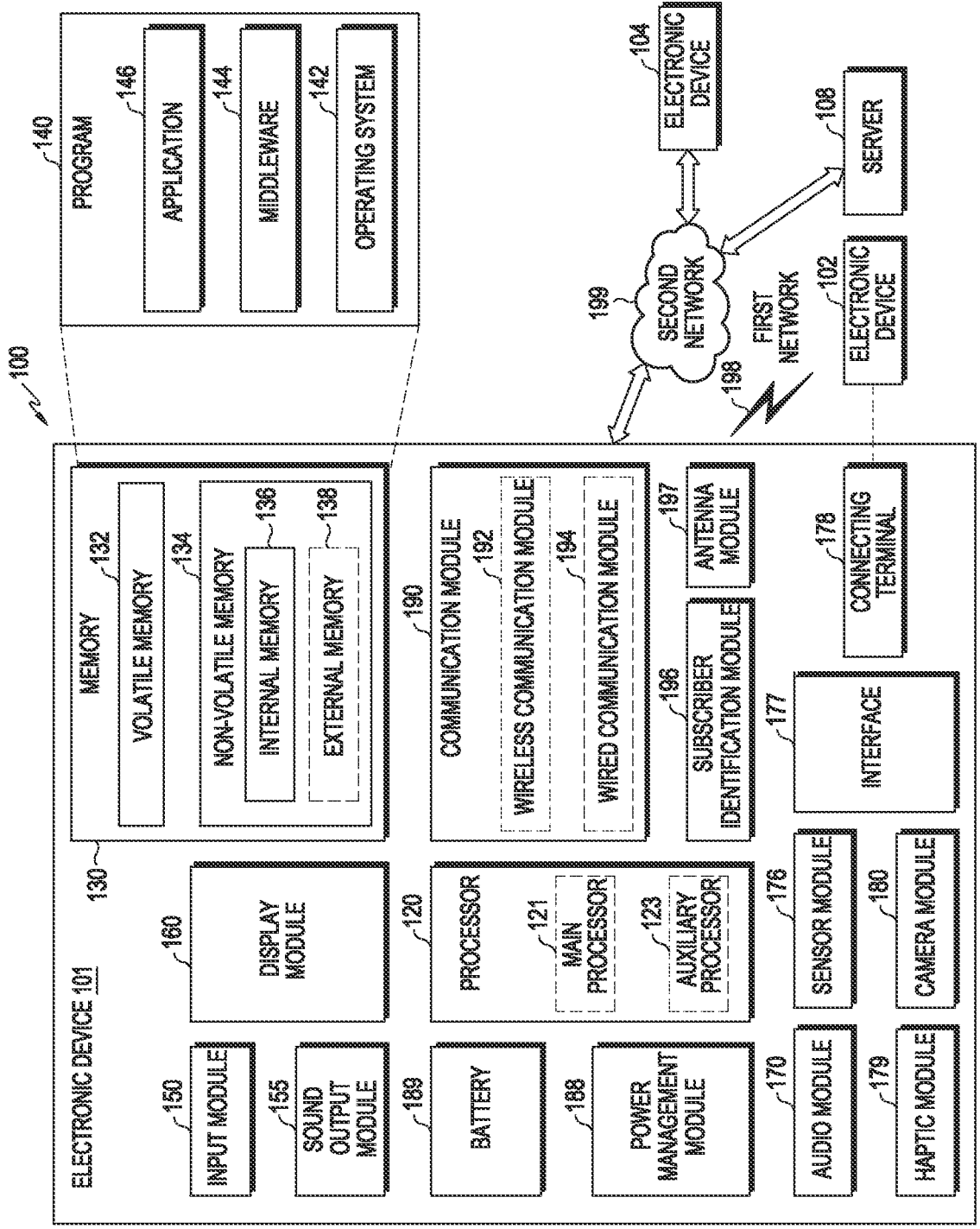
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., the electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 microseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
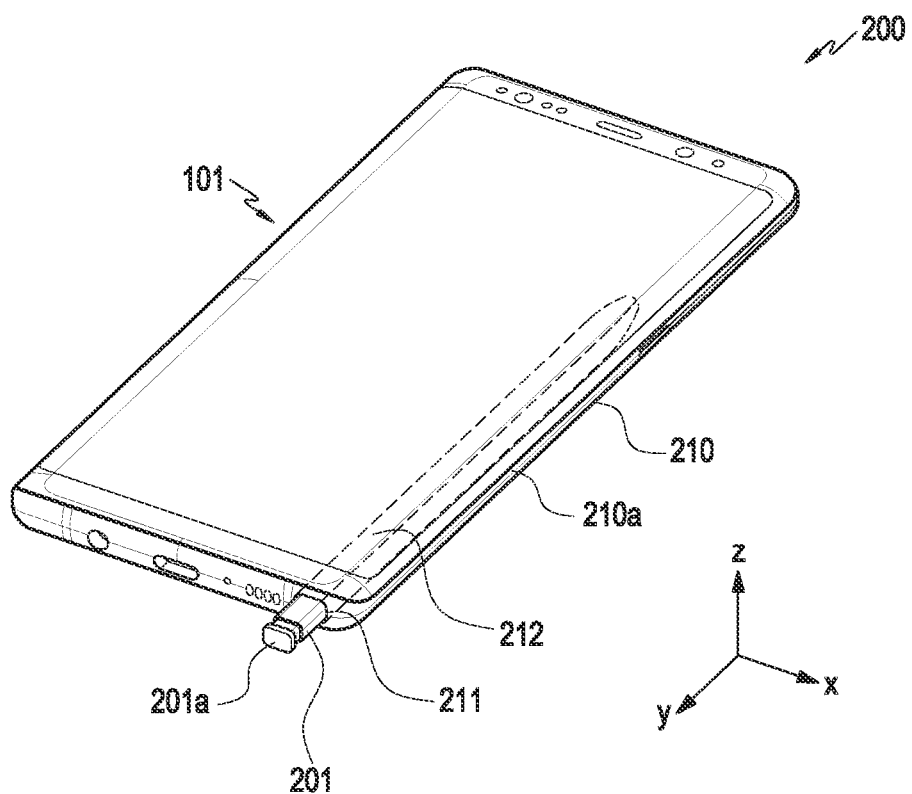
FIG. 2 is a perspective view of an electronic device including a stylus pen according to an embodiment of the disclosure.

FIG. 2 is a perspective view of an electronic device (e.g., electronic device 101) including a stylus pen (e.g., the electronic device 102 in FIG. 1) according to an embodiment of the disclosure. According to an embodiment, the stylus pen may also correspond to an input device (e.g., input module 150 in FIG. 1) rather than the electronic device 102 in FIG. 1.

Referring to FIG. 2, according to various embodiments, perspective view 200 of the electronic device 101 illustrates that the electronic device 101 may include a configuration illustrated in FIG. 1, and include a structure in which a stylus pen 201 is inserted. The electronic device 101 may include a housing 210, and include a hole 211 on one part of the housing 210, for example, one part of a side surface 210a. The electronic device 101 may include a first internal space 212 that is an accommodation space connected to the hole 211, and the stylus pen 201 may be inserted into the first internal space 212. According to an illustrated embodiment, the stylus pen 201 may include a pushable first button 201a disposed at one end thereof, so that it is easy to pull the stylus pen 201 out of the first internal space 212 of the electronic device 101. When the first button 201a is pushed, a repulsion mechanism (e.g., a repulsion mechanism using at least one elastic member (e.g., a spring)) configured in association with the first button 201a is activated, and the stylus pen 201 is removed from the first internal space 212.

According to various embodiments, the electronic device 101 may include a structure allowing the stylus pen 201 to be attached to the electronic device 101. For example, the electronic device 101 may include at least one magnetic body disposed at a position adjacent to an attachment area so that the stylus pen 201 is attached to an exterior of the housing 210. The stylus pen 201 may be attached to the exterior of the housing 210 of the electronic device 101 through the at least one magnetic body.

Figure 3A:
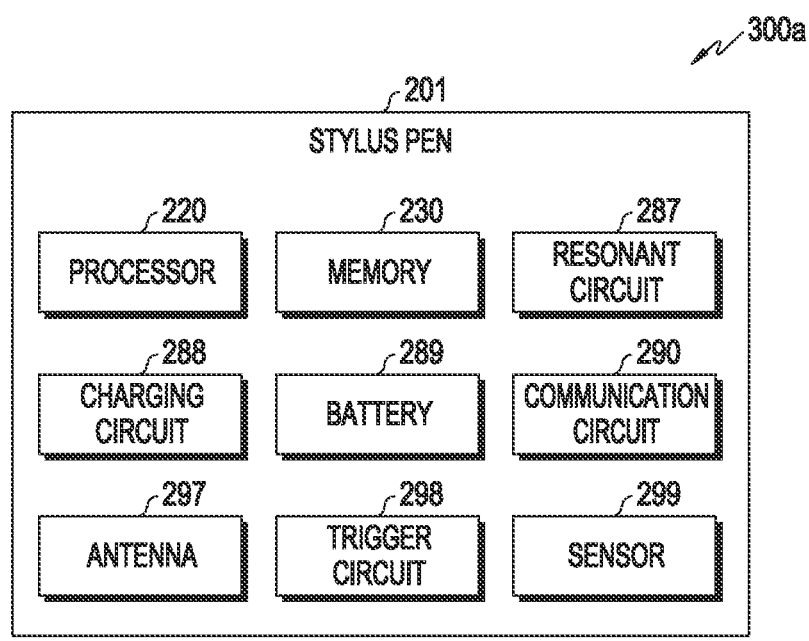
FIG. 3A is a block diagram illustrating a stylus pen according to an embodiment of the disclosure.

FIG. 3A is a block diagram illustrating a stylus pen (e.g., the stylus pen 201 in FIG. 2) according to an embodiment of the disclosure.

Referring to FIG. 3A, according to various embodiments, block diagram 300a illustrates that the stylus pen 201 may include a processor 220, a memory 230, a resonant circuit 287, a charging circuit 288, a battery 289, a communication circuit 290, an antenna 297, a trigger circuit 298, and/or a sensor 299. In some embodiments, the processor 220 of the stylus pen 201, at least a part of the resonant circuit 287, and/or at least a part of the communication circuit 290 may be configured on a printed circuit board or configured in a chip type. The processor 220, the resonant circuit 287, and/or the communication circuit 290 may be electrically connected to the memory 230, the charging circuit 288, the battery 289, the antenna 297, the trigger circuit 298, and/or the sensor 299.

According to various embodiments, the processor 220 may include a customized hardware module or a generic processor configured to execute software (e.g., an application program). The processor 220 may include a hardware element (function) or a software element (program) including at least one of various sensors included in the stylus pen 201, a data measurement module, an input/output interface, a module for managing a state or an environment of the stylus pen 201, or a communication module. The processor 220 may include, for example, one of hardware, software, or firmware, or a combination of two or more. According to an embodiment, the processor 220 may be configured to transmit, to the electronic device 101 via the communication circuit 290, information showing a pushed state of a button (e.g., a button 337), sensing information obtained by the sensor 299, and/or information (information associated with the position of the stylus pen 201) calculated based on the sensing information.

According to various embodiments, the resonant circuit 287 may be resonated based on an electromagnetic field signal generated from a digitizer (e.g., the display module 160) of the electronic device 101, and may radiate an electro-magnetic resonance (EMR) input signal (or magnetic field) due to the resonance. The electronic device 101 may identify the position of the stylus pen 201 on the electronic device 101 by using an electro-magnetic resonance input signal. For example, the electronic device 101 may identify the position of the stylus pen 201, based on the magnitude of induced electromotive force (e.g., output current) generated by an electro-magnetic resonance input signal from each of multiple channels (e.g., multiple loop coils) in a digitizer. In the above description, the electronic device 101 and the stylus pen 201 have been described as operating based on the EMR method, but this merely corresponds to an example. The electronic device 101 may also generate a signal based on an electric field, based on the electrically coupled resonance (ECR) method. The resonant circuit of the stylus pen 201 may be resonated by an electric field. The electronic device 101 may identify potentials of multiple channels (e.g., electrodes) caused by resonance in the stylus pen 201, and may also identify the position of the stylus pen 201, based on potential. The stylus pen 201 may be implemented in the active electrostatic (AES) method, and a person who is skilled in the art would understand that there is no limit to the implementation type thereof. In addition, the electronic device 101 may detect the stylus pen 201, based on a change of a capacitance (self-capacitance or mutual capacitance) associated with at least one electrode of a touch panel. In this case, the stylus pen 201 may not include a resonant circuit. In the disclosure, a "panel" or a "sensing panel" may be used as a term covering a digitizer and a touch screen panel (TSP).

According to various embodiments, the memory 230 may store information related to an operation of the stylus pen 201. For example, the information may include information for communication with the electronic device 101 and frequency information related to an input operation of the stylus pen 201. In addition, the memory 230 may store a program (or an application, an algorithm, or a processing loop) for calculating information (e.g., coordinate information and/or displacement information) on the position of the stylus pen 201 from sensing data of the sensor 299. The memory 230 may also store a communication stack of the communication circuit 290. According to implementation, the communication circuit 290 and/or the processor 220 may include a dedicated memory.

According to various embodiments, the resonant circuit 287 may include a coil (or inductor) and/or a capacitor. The resonant circuit 287 may resonate, based on an input electric field and/or magnetic field (e.g., an electric field and/or magnetic field generated from a digitizer of the electronic device 101). In a case where the stylus pen 201 transmits a signal in the EMR method, the stylus pen 201 may generate a signal including a resonant frequency, based on an electromagnetic field generated from an inductive panel of the electronic device 101. In a case where the stylus pen 201 transmits a signal in the AES method, the stylus pen 201 may generate a signal by using capacity coupling with the electronic device 101. In a case where the stylus pen 201 transmits a signal in the ECR method, the stylus pen 201 may generate a signal including a resonant frequency, based on an electric field generated from a capacitive device of the electronic device. According to an embodiment, the resonant circuit 287 may be used to change frequency or strength of an electromagnetic field according to a user's manipulation state. For example, the resonant circuit 287 may provide various frequencies for recognition of a hovering input, a drawing input, a button input, or an erasing input. For example, the resonant circuit 287 may provide various resonant frequencies according to a connection combination of multiple capacitors, or may provide various resonant frequencies, based on a variable inductor and/or a variable capacitor.

According to various embodiments, in a case where the charging circuit 288 is connected to the resonant circuit 287, based on a switching circuit, the charging circuit may rectify a resonance signal generated from the resonant circuit 287 into a direct current signal, and provide the direct current signal to the battery 289. According to an embodiment, the stylus pen 201 may use a voltage level of a direct current signal detected in the charging circuit 288, to identify whether the stylus pen 201 has been inserted in the electronic device 101. Alternatively, the stylus pen 201 may identify a pattern corresponding to a signal identified in the charging circuit 288, to identify whether the stylus pen 201 has been inserted in the electronic device.

According to various embodiments, the battery 289 may be configured to store power required for an operation of the stylus pen 201. The battery 289 may include, for example, a lithium-ion battery or a capacitor, and may be a rechargeable type or a replaceable type. According to an embodiment, the battery 289 may be charged by using power (e.g., a direct current signal (direct current power)) provided from the charging circuit 288.

According to various embodiments, the communication circuit 290 may be configured to perform a function of wireless communication between the stylus pen 201 and the communication module 190 of the electronic device 101. According to an embodiment, the communication circuit 290 may transmit state information, input information, and/or position-related information of the stylus pen 201 to the electronic device 101 by using a short-range communication method. For example, the communication circuit 290 may transmit, to the electronic device 101, direction information (e.g., motion sensor data) of the stylus pen 201, obtained via the trigger circuit 298, speech information input via a microphone, or remaining capacity information of the battery 289. For example, the communication circuit 290 may transmit, to the electronic device 101, sensing data obtained from the sensor 299 and/or information associated with the position of the stylus pen 201, identified based on the sensing data. For example, the communication circuit 290 may transmit, to the electronic device 101, information on a state of a button (e.g., the button 337) included in the stylus pen 201. For example, the short-range communication method may include at least one of Bluetooth™, Bluetooth™ low energy (BLE), NFC, and Wi-Fi direct, but there is no limit to the type thereof.

According to various embodiments, the antenna 297 may be used to transmit or receive a signal or power to or from the outside (e.g., the electronic device 101). According to an embodiment, the stylus pen 201 may include multiple antennas 297, and may select at least one antenna 297 suitable for a communication method there among. The communication circuit 290 may exchange a signal or power with an external electronic device via the selected at least one antenna 297.

According to various embodiments, the trigger circuit 298 may include at least one button or a sensor circuit. According to an embodiment, the processor 220 may identify a type (e.g., an EMR button or a BLE button) or an input method (e.g., touch or push) of a button of the stylus pen 201. According to an embodiment, the trigger circuit 298 may use an input signal to the button or a signal via the sensor 299 to transmit a trigger signal to the electronic device 101.

According to various embodiments, the sensor 299 may include an acceleration sensor (accelerometer), a gyro sensor, and/or a geomagnetic sensor. The acceleration sensor may sense a linear movement of the stylus pen 201 and/or information on 3-axis, 6-axis, and/or 9-axis acceleration of the stylus pen 201. The gyro sensor may sense information related to rotation of the stylus pen 201. The geomagnetic sensor may sense information on a direction in which the stylus pen 201 is oriented in an absolute coordinate system. According to an embodiment, the sensor 299 may include, as well as a sensor for measuring movement, a sensor capable of generating an electrical signal or a data value corresponding to an internal operation state or an external environment state of the stylus pen 201, and the sensor may include, for example, at least one of a remaining battery power detecting sensor, a pressure sensor, an optical sensor, a temperature sensor, and a biometric sensor. According to various embodiments, the processor 220 may transmit information obtained from the sensor 299 to the electronic device 101 via the communication circuit 290. Alternatively, the processor 220 may transmit information (e.g., the coordinates of the stylus pen 201 and/or the displacement of the stylus pen 201) associated with the position of the stylus pen 201 to the electronic device 101 via the communication circuit 290, based on information obtained from the sensor 299.

Figure 3B:
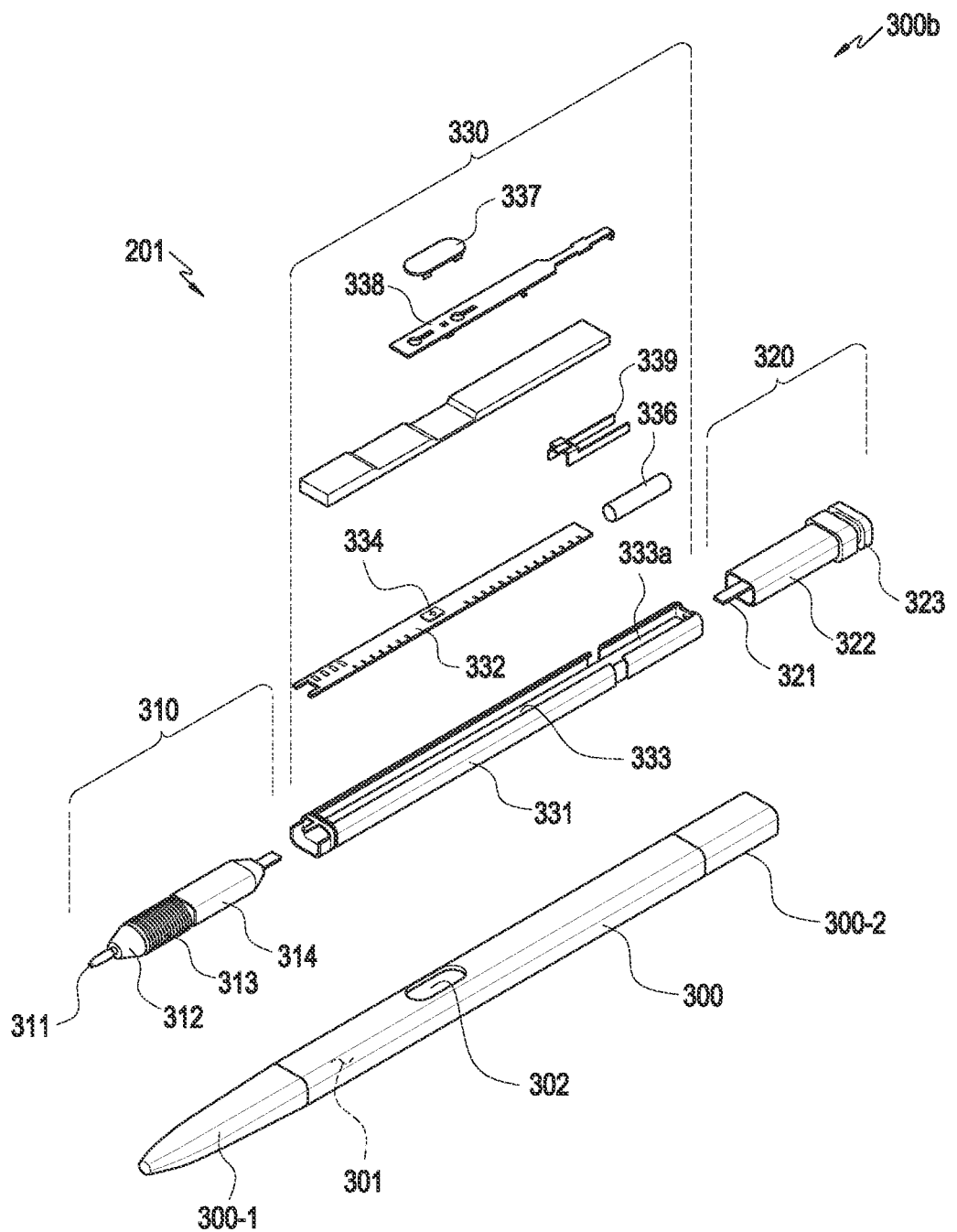
FIG. 3B is an exploded perspective view of a stylus pen according to an embodiment of the disclosure.

FIG. 3B is an exploded perspective view of a stylus pen (e.g., the stylus pen 201 in FIG. 2) according to an embodiment of the disclosure.

Referring to FIG. 3B, exploded perspective view 300b illustrates that the stylus pen 201 may include a pen housing 300 configuring an external shape of the stylus pen 201 and an inner assembly in the pen housing 300. In an illustrated embodiment, the inner assembly may be inserted in the pen housing 300 by an assembling operation performed one time in a state where several components mounted in the stylus pen 201 have been combined together.

The pen housing 300 may have a shape lengthily extending between a first end 300-1 and a second end 300-2, and may include a second internal space 301 therein. The pen housing 300 may have a cross section of an oval shape including a longer axis and a shorter axis, and may generally have an oval cylinder shape. The first internal space 212 of the electronic device 101 described above with reference to FIG. 2 may also have a cross section of an oval shape corresponding to the shape of the pen housing 300. According to an embodiment, at least a part of the pen housing 300 may include a synthetic resin (e.g., plastic) and/or a metallic material (e.g., aluminum). According to an embodiment, the first end 300-1 of the pen housing 300 may be configured by a synthetic resin material. Various other embodiments may be applied for the material of the pen housing 300.

The inner assembly may have a lengthily extended shape to correspond to the shape of the pen housing 300. The inner assembly may generally be divided into three configurations in the lengthwise direction. For example, the inner assembly may include a coil part 310 disposed at a position corresponding to the first end 300-1 of the pen housing 300, an ejection member 320 disposed at a position corresponding to the second end 300-2 of the pen housing 300, and a circuit board part 330 disposed at a position corresponding to a body of the pen housing 300.

The coil part 310 may include a pen tip 311 exposed out of the first end 300-1 when the inner assembly is fully inserted in the pen housing 300, a packing ring 312, a coil 313 wound multiple times, and/or a pen pressure detecting unit 314 for obtaining a pressure change caused by pressing of the pen tip 311. The packing ring 312 may include epoxy, rubber, urethane, or silicone. The packing ring 312 may be included for the purpose of waterproof and dustproof, and may protect the coil part 310 and the circuit board part 330 from dust or water when the pen is dropped in water. According to an embodiment, the coil 313 may generate a resonant frequency at a configured frequency band (e.g., 500 kilohertz (kHz)), and may be combined with at least one element (e.g., a capacitive element (capacitor)) to adjust a resonant frequency generated by the coil 313 within a predetermined range.

The ejection member 320 may include a configuration for ejecting the stylus pen 201 from the first internal space 212 of an electronic device (e.g., the electronic device 101 in FIG. 2). According to an embodiment, the ejection member 320 may include a shaft 321, and an ejection body 322 and a button part 323 (e.g., the first button 201a in FIG. 2) arranged at a circumference of the shaft 321 and configuring an overall external shape of the ejection member 320. When the inner assembly is fully inserted in the pen housing 300, a part including the shaft 321 and the ejection body 322 may be surrounded by the second end 300-2 of the pen housing 300, and at least a part of the button part 323 may be exposed out of the second end 300-2. Non-illustrated multiple components, for example, cam members or elastic members are arranged in the ejection body 322 to configure a push-pull structure. In an embodiment, the button part 323 may be substantially coupled to the shaft 321 to linearly reciprocate with respect to the ejection body 322. According to various embodiments, the button part 323 may include a button having an engagement structure allowing a user to eject the stylus pen 201 by using a nail. According to an embodiment, the stylus pen 201 may include a sensor that detects linear reciprocation of the shaft 321, thereby providing another input method.

The circuit board part 330 may include a printed circuit board 332, and a base 331 and an antenna surrounding at least one surface of the printed circuit board 332. According to an embodiment, a substrate seating part 333 on which the printed circuit board 332 is disposed is configured on a top surface of the base 331, and the printed circuit board 332 may be fixed to be seated on the substrate seating part 333. According to an embodiment, the printed circuit board 332 may include a first surface and a second surface, a variable capacitor or a switch 334 connected to the coil 313 may be disposed on the first surface, and a charging circuit, a battery 336, or a communication circuit may be disposed on the second surface. The first surface and the second surface of the printed circuit board 332 may, according to an embodiment, indicate different stacked surfaces in a structure of the surfaces stacked on another, and according to another embodiment, indicate different parts of the printed circuit board 332 arranged in the lengthwise direction of the printed circuit board. The battery 336 may include an electric double layered capacitor (EDLC). The charging circuit may be disposed between the coil 313 and the battery, and include a voltage detector circuitry and a rectifier. The battery 336 may not be necessarily disposed on the second surface of the printed circuit board 332. The position of the battery 336 may be variously configured according to various mounting structures of the circuit board part 330, and may be different from that illustrated in the drawing.

The antenna may include an antenna structure 339 as an example illustrated in FIG. 3B and/or an antenna embedded in the printed circuit board 332. According to various embodiments, the switch 334 may be disposed on the printed circuit board 332. A second button (e.g., button 337) included in the stylus pen 201 may be used to push the switch 334, and may be exposed outside through a lateral opening 302 of the pen housing 300. While the second button 337 is supported by a support member 338, when there is no external force applied to the second button 337, the support member 338 may provide an elastic restoring force to restore or maintain the second button 337 to be disposed at a predetermined position. The second button 337 may be implemented in one of a physical key type, a touch key type, a motion key type, a pressure key type, and a key-less type, and there is no limit to the implementation type of the button.

The circuit board part 330 may include, for example, a packing ring such as an O-ring. According to an embodiment, O-rings made of an elastic body are arranged at both ends of the base 331, so that a sealing structure may be configured between the base 331 and the pen housing 300. In an embodiment, the support member 338 may configure a sealing structure by partially coming into close contact with an internal wall of the pen housing 300 around the lateral opening 302. For example, the circuit board part 330 may include a waterproof/dustproof structure similar to the packing ring 312 of the coil part 310, disposed on at least a part thereof.

The stylus pen 201 may include a battery seating part 333a on which the battery 336 is disposed, which is disposed on the top surface of the base 331. The battery 336 capable of being loaded on the battery seating part 333a may, for example, include a cylinder type battery.

The stylus pen 201 may include a microphone (not illustrated) and/or a speaker. The microphone and/or the speaker may be directly connected to the printed circuit board 332, or may be connected to a separate flexible printed circuit board (FPCB) (not illustrated) connected to the printed circuit board 332. According to various embodiments, the microphone and/or the speaker may be disposed at a position parallel to the second button 337 in the longitudinal direction of the stylus pen 201.

Figure 4:
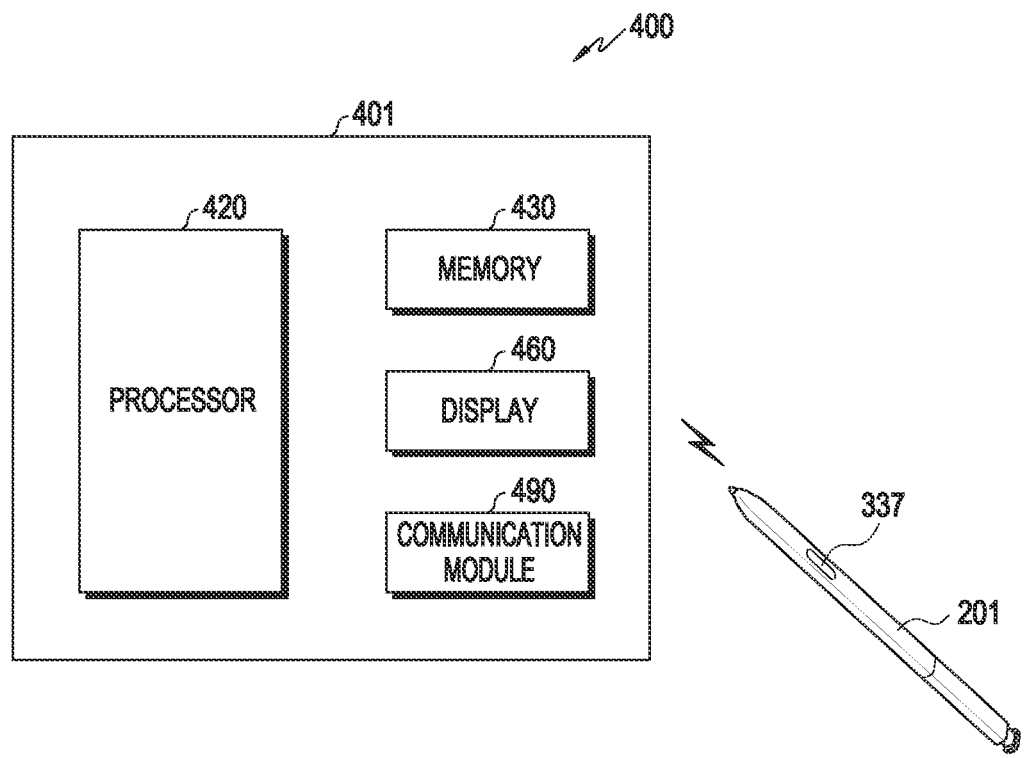
FIG. 4 is a block diagram illustrating an electronic device according to an embodiment of the disclosure.

FIG. 4 is a block diagram illustrating an electronic device according to an embodiment of the disclosure.

Referring to FIG. 4, block diagram 400 illustrates that an electronic device 401 (e.g., the electronic device 101 in FIG. 1) may include a processor 420, a memory 430, a display 460, and a communication module 490.

According to various embodiments, the processor 420 may control overall operations of the electronic device 401, may be the same as the processor 120 in FIG. 1, or may perform at least one function or operation performed by the processor 120.

According to various embodiments, the processor 420 may identify an air pointer initiation event of the stylus pen 201 (e.g., the stylus pen 201 in FIGS. 2, 3A, and 3B).

According to an embodiment, after detachment of the stylus pen 201 from the electronic device 401 is detected, when execution of an air gesture operation of the stylus pen 201 is identified, the processor 420 may identify occurrence of an air pointer initiation event of the stylus pen.

According to an embodiment, after short-range communication is established between the electronic device 401 and the stylus pen 201 via the communication module 490, when occurrence of an initiation event of an air pointer of the stylus pen is identified, the processor 420 may display the air pointer on the display 460. For example, the processor 420 may detect an event of pushing a button for a predetermined time or longer from the stylus pen 201, thereby identifying occurrence of an initiation event of the air pointer. As another example, the processor 420 may detect a pre-designated gesture from the stylus pen 201, thereby identifying occurrence of an initiation event of the air pointer. As yet another example, the processor 420 may select an air pointer-related object displayed on the display 460, thereby identifying occurrence of an initiation event of the air pointer.

According to various embodiments, the processor 420 may display the air pointer of the stylus pen on the display 460, based on rotation information of the display and information of at least one application being executed in the electric device.

According to an embodiment, the rotation information of the display may include horizontal rotation information of the display or vertical rotation information of the display.

According to an embodiment, when horizontal rotation information (e.g., landscape mode) of the display is identified in the rotation information of the display, the processor 420 may display the air pointer on the display 460 while calculating a movement distance of the air pointer through multiplication of, by a fixed constant value, a horizontal distance value among movement distance values of the air pointer corresponding to a movement distance of the stylus pen 201 so as to allow easier movement of the air pointer in the horizontal direction on the display 460. For example, when horizontal rotation information (e.g., landscape mode) of the display is identified in the rotation information of the display, in a case where the stylus pen 201 is moved by 10 centimeters (cm) in the horizontal direction and 10 cm in the vertical direction, the processor 420 may display, on the display, the air pointer after moving same to a M (D*R) pixel obtained by multiplying a D pixel corresponding to 10 cm in the horizontal direction by a constant (R, R>1.0), and to a D pixel corresponding to 10 cm in the vertical direction.

According to an embodiment, when vertical rotation information (e.g., portrait mode) of the display is identified in the rotation information of the display, the processor 420 may display the air pointer on the display 460 while calculating a movement distance of the air pointer through multiplication of, by a fixed constant value, a vertical distance value among movement distance values of the air pointer corresponding to a movement distance of the stylus pen 201 so as to allow easier movement of the air pointer in the vertical direction on the display 460. For example, when vertical rotation information (e.g., portrait mode) of the display is identified in the rotation information of the display, in a case where the stylus pen 201 is moved by 10 cm in the horizontal direction and 10 cm in the vertical direction, the processor 420 may display, on the display 460, the air pointer after moving same to a D pixel corresponding to 10 cm in the horizontal direction, and to a M (D*R) pixel obtained by multiplying a D pixel corresponding to 10 cm in the vertical direction by a constant (R, R>1.0).

According to an embodiment, in a case where the display 460 includes a flexible display (e.g., a foldable display, a rollable display, and/or a slidable display), the processor 420 may detect a change of the size of the display. In a case where the size of the flexible display is changed, the processor 420 may calculate the number of pixels in the horizontal direction and the number of pixels in the vertical direction of the display, the size of which has been changed, calculate a moved position of the air pointer with respect to a direction having more pixels based on the calculation in the same method as that using horizontal rotation information (e.g., landscape mode) of the display or vertical rotation information (e.g., portrait mode) of the display, and display the air pointer on the flexible display.

According to an embodiment, the information of at least one application being executed in the electronic device may include type information of the application and information of a function object capable of function execution. The function object indicates an object capable of executing a function through an air gesture of the stylus pen 201 among multiple objects included in the application, and may include, for example, a button, an input field, a slide button, or a URL link.

According to an embodiment, in a case where multiple applications are executed in the electronic device, the processor 420 may divide an area of the display 460 into areas to correspond to the number of the application being executed and display the multiple applications in the divided areas, and identify information of a function object capable of function execution among objects included in each of the multiple applications.

According to an embodiment, when it is identified, based on information of at least one application being executed in the electronic device, that an area in which the air pointer is positioned on the display 460 displaying the application being executed is an area of a function object capable of function execution, the processor 420 may display the area of the function object, in which the air pointer is positioned, to be distinguished from the other areas. For example, the processor 420 may highlight and display the area of the function object, in which the air pointer is positioned, to be distinguished from the other areas so that a user is able to easily recognize that the air pointer has moved to a desired position.

According to various embodiments, when a selection event is received from the stylus pen 201, the processor 420 may identify first position information among multiple pieces of position information for the air pointer, which are detected by an operation of the selection event, identify a function object configured in an area including the first position information, and perform a function of the function object corresponding to the selection event.

According to an embodiment, the processor 420 may receive the selection event generated by an operation of pressing the button 337 included in the stylus pen 201 and an operation of releasing the press of the button, and calculate and store position information (e.g., coordinate information) of the air pointer on the display 460 when the selection event is received. The processor 420 may calculate and store first position information of the air pointer at a time point of pressing the button 337 included in the stylus pen 201, that is, when the selection event is started, and second position information of the air pointer at a time point of releasing the press of the button 337 included in the stylus pen, that is, when the selection event is terminated.

According to an embodiment, the processor 420 may store pattern information of the stylus pen from a time point of storing the first position information to a time point of storing the second position information. When a shape of a movement trajectory allowing recognition that the stylus pen 201 has shaken due to a press of the button 337 included in the stylus pen 201 is identified based on pattern information of the stylus pen, the processor 420 may identify selection of the function object corresponding to the selection event.

According to an embodiment, the processor 420 may identify whether an area including the first position information is an area of the function object capable of function execution, based on information of at least one application being executed in the electronic device.

According to an embodiment, the area of the function object may include an area obtained by expanding an area pre-configured in the application by a predetermined area.

According to an embodiment, when the processor 420 identifies, based on the information of the at least one application being executed in the electronic device, whether an area including the first position information is an area of the function object capable of function execution, the area including the first position information may include an expanded area of the function object, which is obtained by expanding an area pre-configured in the application by a predetermined area.

According to various embodiments, the memory 430 may be implemented to be substantially identical or similar to the memory 130 in FIG. 1.

According to an embodiment, the memory 430 may store first position information of the air pointer at a time point of pressing the button 337 included in the stylus pen 201, that is, when a selection event is started, and second position information of the air pointer at a time point of releasing the press of the button 337 included in the stylus pen, that is, when the selection event is terminated, the first information and the second information being calculated according to reception of the selection event from the stylus pen 201. The memory 430 may store pattern information of the stylus pen corresponding to a shape of a movement trajectory allowing recognition that the stylus pen 201 has shaken due to a press of the button 337 included in the stylus pen, from a time point of storing the first position information to a time point of storing the second position information.

According to various embodiments, the display 460 may be implemented to be substantially identical or similar to the display module 160 in FIG. 1.

According to an embodiment, the display 460 may display an air pointer moving to correspond to the movement of the stylus pen 201 (e.g., the stylus pen 201 in FIG. 2), and display various shapes of air pointers according to an application being executed.

According to an embodiment, the display 460 may detect an input (e.g., air gesture) of the stylus pen 201 (e.g., the stylus pen 201 in FIG. 2), and detect a touch as well as support a data input/output function.

According to various embodiments, the communication module 490 may be implemented to be substantially identical or similar to the communication module 190 in FIG. 1, and may include multiple communication circuits using different communication techniques.

According to an embodiment, the communication module 490 may include at least one of a wireless LAN module (not illustrated) and a short-range communication module (not illustrated), and may include, as the short-range communication module (not illustrated), an ultrawideband (UWB) communication module, a Wi-Fi communication module, a near field communication (NFC) communication module, a Bluetooth™ legacy communication module, and/or a BLE communication module.

According to an embodiment, a communication circuit (e.g., the communication module 490) may receive state information, input information, and/or position-related information of the stylus pen 201 from the stylus pen 201 via communication with the stylus pen 201. For example, the communication module 490 may receive direction information (e.g., motion sensor data) of the stylus pen 201 obtained via the trigger circuit 298 of the stylus pen 201, speech information input via a microphone of the stylus pen 201, or remaining power information of the battery 289 of the stylus pen 201. For example, the communication module 490 may receive sensing data obtained from the sensor 299 of the stylus pen 201 and/or information associated with the position of the stylus pen 201 identified based on the sensing data. For example, the communication module 490 may receive information on a state of the button 337 included in the stylus pen 201.

Figure 5A:
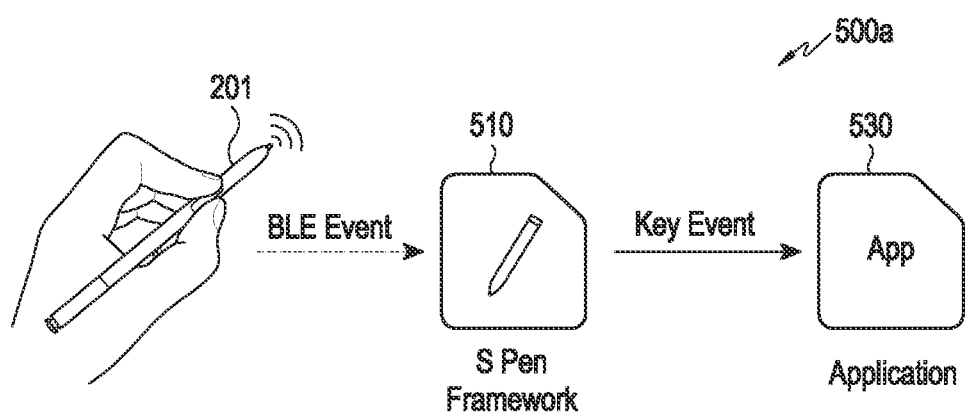
FIGS. 5A, 5B, and 5C are diagrams illustrating an operation of processing an event received from a stylus pen in an electronic device according to various embodiments of the disclosure.
Figure 5B:
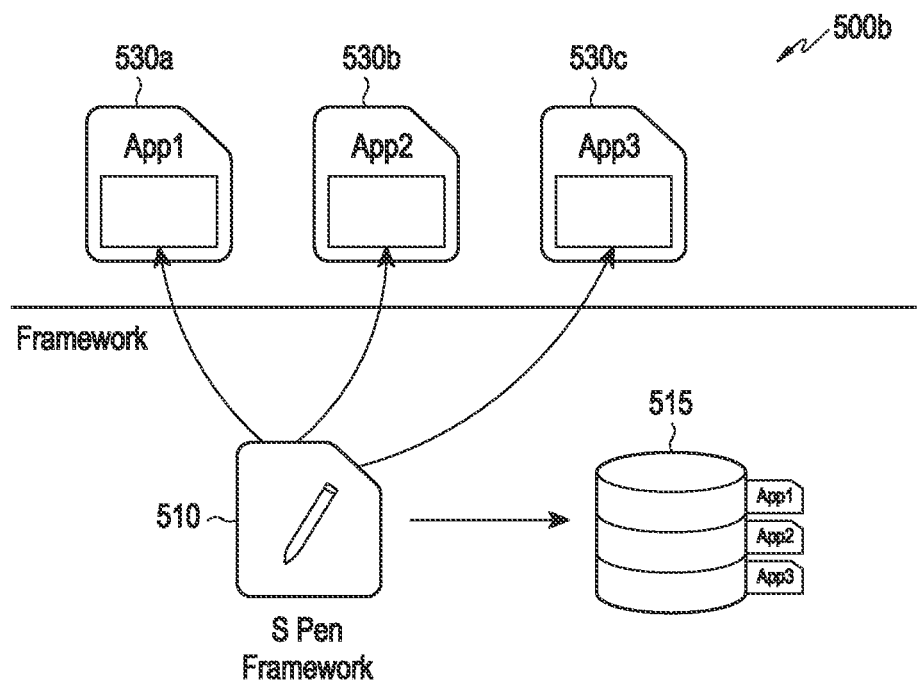
Figure 5C:
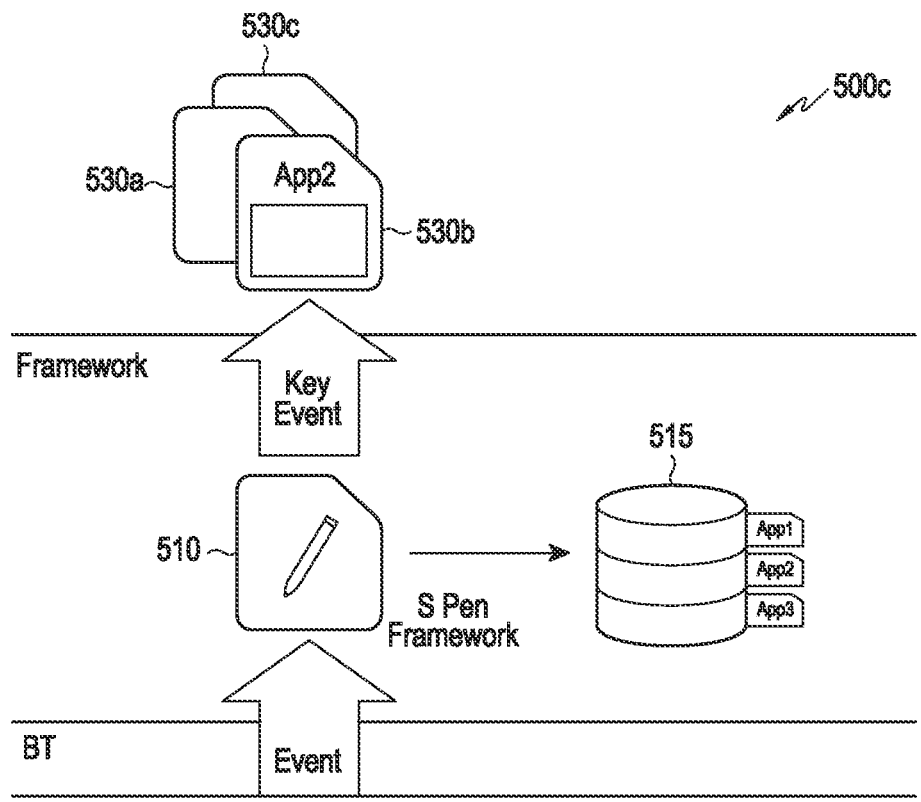

FIGS. 5A, 5B, and 5C are diagrams illustrating an operation of processing an event received from a stylus pen in an electronic device according to various embodiments of the disclosure.

Referring to FIG. 5A, diagram 500a illustrates that the stylus pen 201 may be connected to an electronic device via communication in a short-range communication method (e.g., Bluetooth™ low energy (BLE) method), and communication established between the electronic device and the stylus pen 201 may be managed by a stylus pen framework 510 of the electronic device. An event (e.g., BLE event) received from the stylus pen 201 through a short-range communication method may be transmitted to the stylus pen framework 510, and the stylus pen framework 510 may convert the received event to KeyEvents and transmit same to an application 530. Therefore, the application 530 may process an event received from the stylus pen 201 while using conventional KeyEvents Callback without adding a different interface.

Referring to FIG. 5B, diagram 500b illustrates that the stylus pen framework 510 may convert the event received from the stylus pen 201 to KeyEvents and transmit same to applications 530a, 530b, or 530c, and store the KeyEvents having been transmitted to the applications 530a, 530b, or 530c in a separate DB 515 in an xml type.

Referring to FIG. 5C, diagram 500c illustrates that the stylus pen framework 510 having received an event from the stylus pen 201 may identify a first application 530a executed in the foreground among the multiple applications 530a, 530b, and 530c being executed in the electronic device. The stylus pen framework 510 may search the separate DB 515 for a KeyEvent corresponding to the event received from the stylus pen 201 among KeyEvents used in a second application 530b, and when the stylus pen framework transmits the discovered KeyEvent to a KeyEvent Callback of the second application 530b, the second application 530b may perform a task defined in the received KeyEvent.

Figure 6:
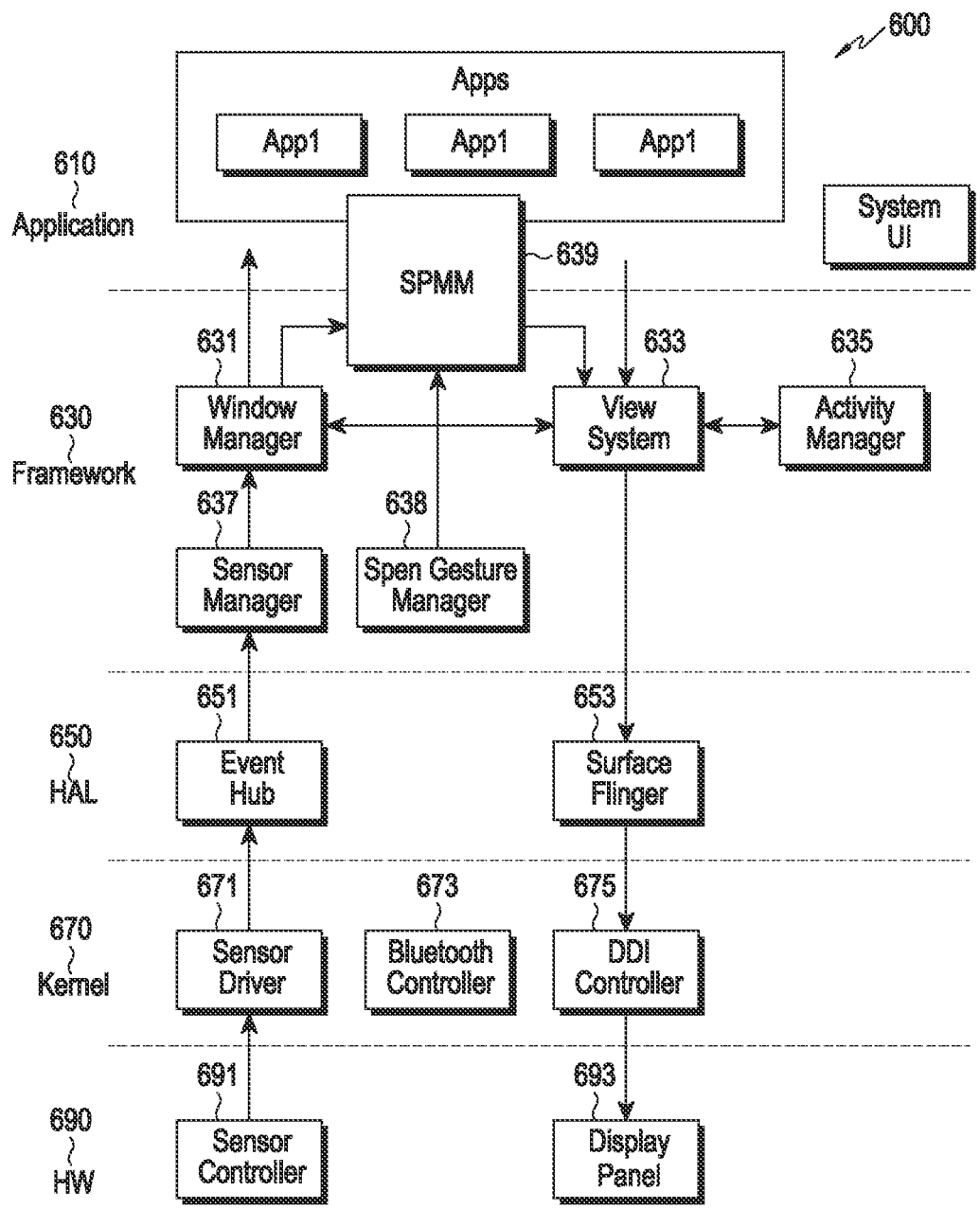
FIG. 6 is a diagram illustrating a software module configuration of an electronic device according to an embodiment of the disclosure.

FIG. 6 is a diagram illustrating a software module configuration of an electronic device according to an embodiment of the disclosure.

Referring to FIG. 6, diagram 600 illustrates that a platform included in a memory (e.g., the memory 130 in FIG. 1 or the memory 430 in FIG. 4) of an electronic device (e.g., the electronic device 101 in FIG. 1 or the electronic device 401 in FIG. 4) may include an application layer 610, a framework layer 630, a library layer 650, a kernel layer 670, and a hardware layer 690.

The application layer 610 may include at least one application and a system UI. The application layer 610 may draw at least one layer based on the resolution of a display area of a display. According to an embodiment, the application may use a drawing library (e.g., view) to draw at least one layer based on the resolution of a display area of the display. According to an embodiment, the application may be a call application, an Internet browser, a video application, and a game application, and there is no limit to the type thereof. According to an embodiment, the system UI may indicate an application configuring several graphical user interface (GUI) screens implemented on a system of the electronic device, such as a notification bar or a quick view.

The framework layer 630 may include a window manager 631, a view system 633, an activity manager 635, a sensor manager 637, a stylus pen gesture manager 638, and a stylus pointer movement manager (SPMM) 639. According to an embodiment, the framework layer 630 may provide various functions to an application so that a function or information provided from one or more resources of the electronic device are used by the application. The window manager 631 may manage one or more GUI resources used in a screen of the electronic device. For example, when a change of a state of the electronic device is identified via a sensor module, the window manager 631 may transfer, to an application, information of a display area corresponding to the changed state of the electronic device. For example, when a change of a state of the electronic device is identified, the window manager may transfer information of a display area corresponding to the changed state of the electronic device to an application for which continuity is configured, among applications being executed.

The view system 633 may be a module for drawing at least one layer, based on the resolution of a display area of the display. According to an embodiment, an application may use the view system 633 to draw at least one layer based on the resolution of a display area of the display. The activity manager 635 may manage a life cycle and an activity stack of an application. The sensor manager 637 may include a module capable of controlling based on application availability of a sensor. The stylus pen gesture manager 638 may include a module capable of controlling gesture information received from a stylus pen. The stylus pointer movement manager (SPMM) 639 may include a module capable of controlling position information (e.g., coordinate information) of an air pointer according to a movement of a stylus pen.

The library layer 650 is a hardware abstraction layer (HAL), may indicate an abstracted layer between multiple hardware modules included in the hardware layer and software of the electronic device, and may include an event hub 651 and a surface flinger 653. The event hub 651 may indicate an interface module in which an event generated in a touch module and a sensor module is standardized. The surface flinger 653 may synthesize multiple layers. In an embodiment, the surface flinger 653 may provide data indicating synthesized multiple layers to a display controller.

The kernel layer 670 may include various drivers for controlling various hardware modules included in the electronic device, and may include a sensor driver 671 including an interface module controlling a sensor controller connected to a sensor, a Bluetooth™ controller 673, and a display controller (DDI) 675. The sensor driver 671 may include a sensor control interface module. The Bluetooth™ controller 673 may control Bluetooth™ communication. The display controller (DDI controller) 675 may correspond to a display drive circuit. In an embodiment, the display controller (DDI controller) 675 may be implemented as hardware or software.

The hardware layer 690 may identify a change of a state of the electronic device, based on a sensor module, and may include a sensor controller 691 controlling the sensor module, and a display panel 693 capable of displaying contents, based on control of the DDI controller. According to an embodiment, the display panel 693 may indicate a display device.

Figure 7:
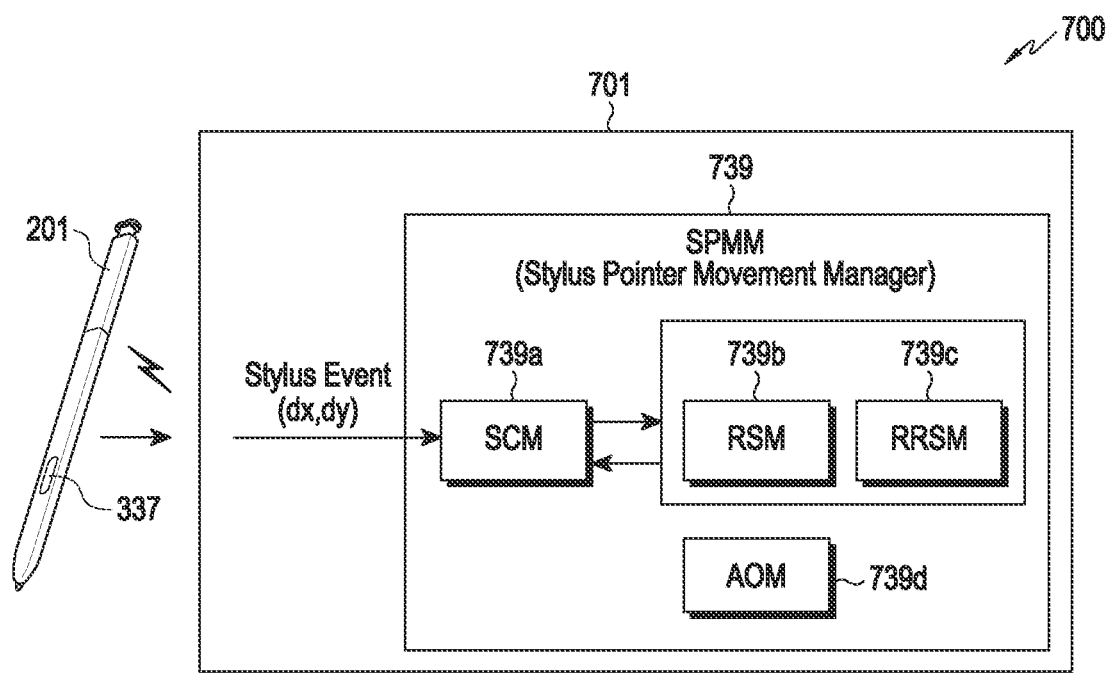
FIG. 7 is a diagram illustrating a stylus pointer movement manager (SPMM) in an electronic device according to an embodiment of the disclosure.

FIG. 7 is a diagram illustrating a stylus pointer movement manager (SPMM) in an electronic device according to an embodiment of the disclosure.

Referring to FIG. 7, diagram 700 illustrates that a stylus pointer movement manager (SPMM) 739 (e.g., the SPMM 639 in FIG. 6) of an electronic device 701 (e.g., the electronic device 101 in FIG. 1 or the electronic device 401 in FIG. 4) may include a stylus coordinate module (SCM) 739a, a rotation state module (RSM) 739b, a refresh rate state module (RRSM) 739c, and an application object module (AOM) 739d.

The stylus coordinate module (SCM) 739a may map coordinate information from the stylus pen 201 to a corresponding function. According to an embodiment, the electronic device 701 may map coordinate information to a corresponding function, based on an event (e.g., a BLE event) received from the stylus pen 201 connected in a short-range communication method. According to an embodiment, the electronic device 701 may map coordinate information to a corresponding function, based on feature information (e.g., rotation information of a display) of a display, feature information (e.g., information of at least one application being executed in the electronic device) of an application, and/or information of an offset for a movement speed of the stylus pen 201.

The rotation state module (RSM) 739b may determine rotation information (e.g., horizontal rotation information and/or vertical rotation information) for a display of the electronic device. According to an embodiment, the electronic device 701 may include at least one sensor that detects a state of the electronic device 410. For example, the electronic device 701 may use a gyro sensor, an acceleration sensor, and a geomagnetic sensor as a 9-axis motion sensor, and use the 9-axis motion sensor to determine azimuth information, roll information, and/or pitch information to determine whether rotation information of the electronic device 701 is horizontal rotation information or vertical rotation information.

The refresh rate state module (RRSM) 739c may determine scan rate information for a display of the electronic device. The information of the display may include screen resolution information, and the screen resolution information may include information of HD+(1600×720), FHD+(2400×1080), or WQHD+(3200×1440). The information of the display may include refresh rate information of the screen, and the refresh rate information of the screen may include information of 60 Hz or 120 hertz (Hz).

The application object module (AOM) 739d may perform an operation of receiving and analyzing information of at least one application, and determine a function object capable of executing a function through an air gesture among multiple objects displayed on the display. The function object may include, for example, a button, an input field, a slide button, or a URL link.

Figure 8:
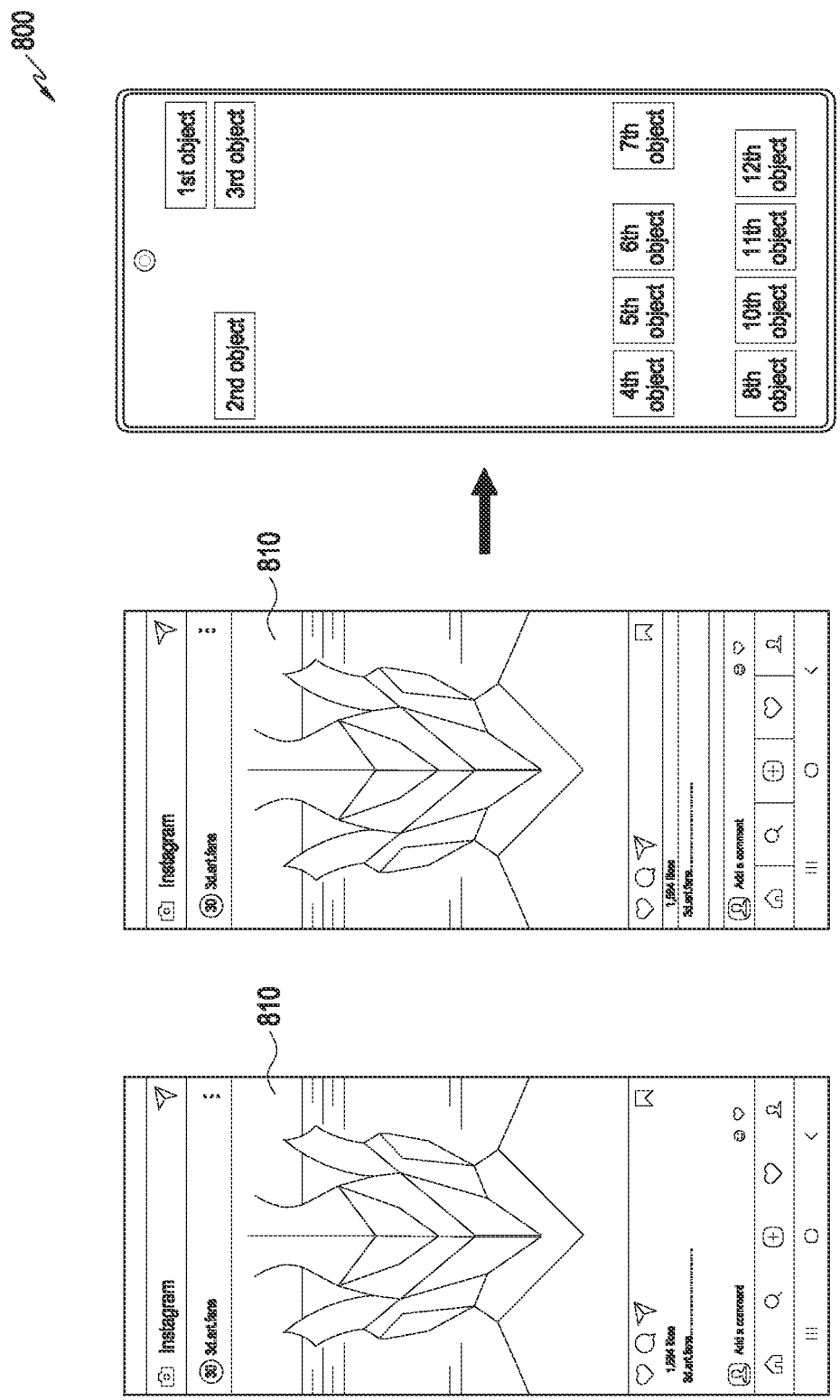
FIG. 8 is a diagram illustrating a function object in an electronic device according to an embodiment of the disclosure.

FIG. 8 is a diagram illustrating a function object in an electronic device according to an embodiment of the disclosure.

Referring to FIG. 8, diagram 800 illustrates that, when a first application 810 is being executed among multiple applications in an electronic device, the electronic device may analyze feature information of the first application 810 to determine function objects (e.g., a 1st object, a 2nd object, a 3rd object, a 4th object, a 5th object, a 6th object, a 7th object, an 8th object, a 9th object, a 10th object, an 11th object, and a 12th object) capable of executing a function through an air gesture among multiple objects included in the first application.

Figure 9A:
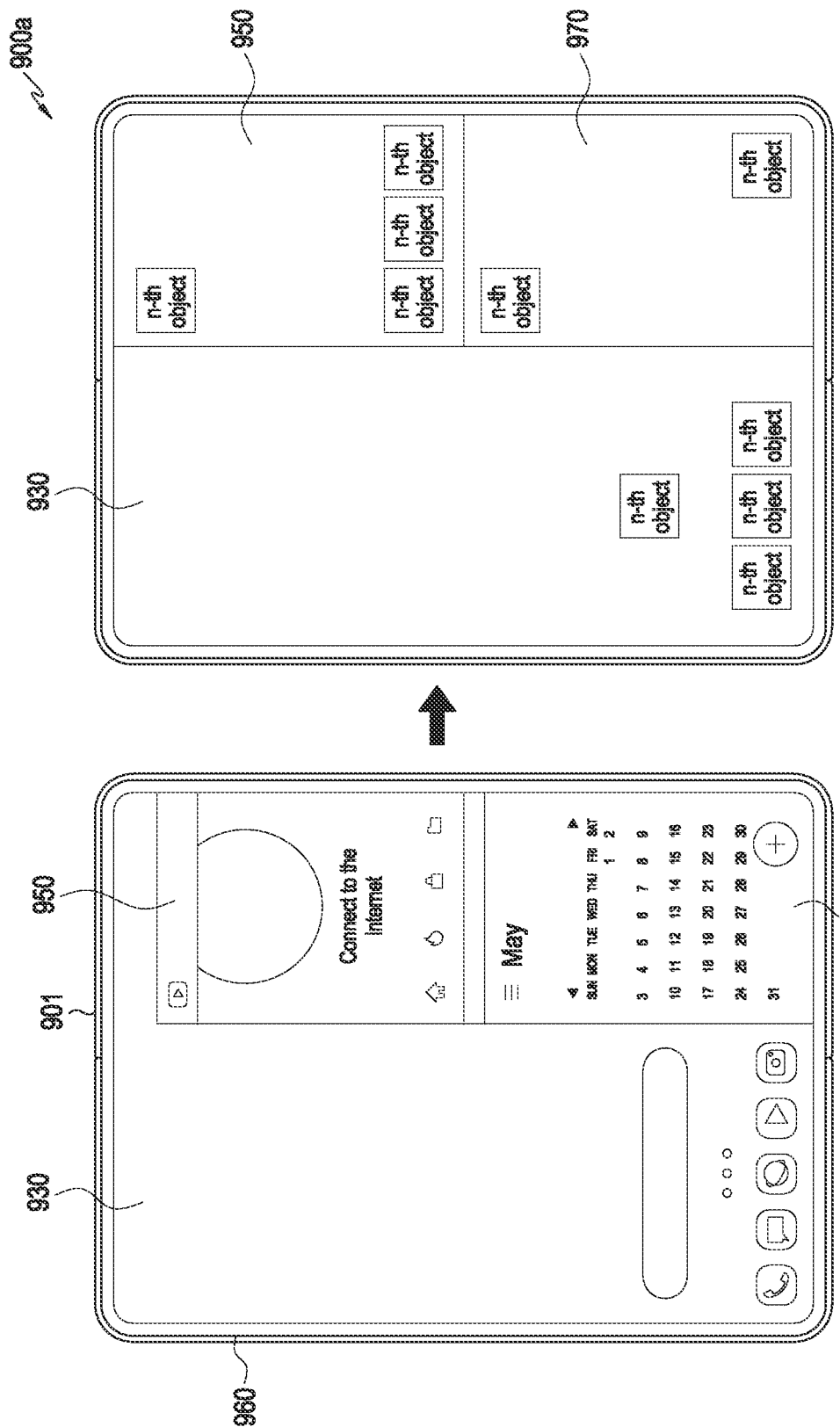
FIGS. 9A and 9B are diagrams illustrating display of multiple applications in an electronic device according to various embodiments of the disclosure.
Figure 9B:
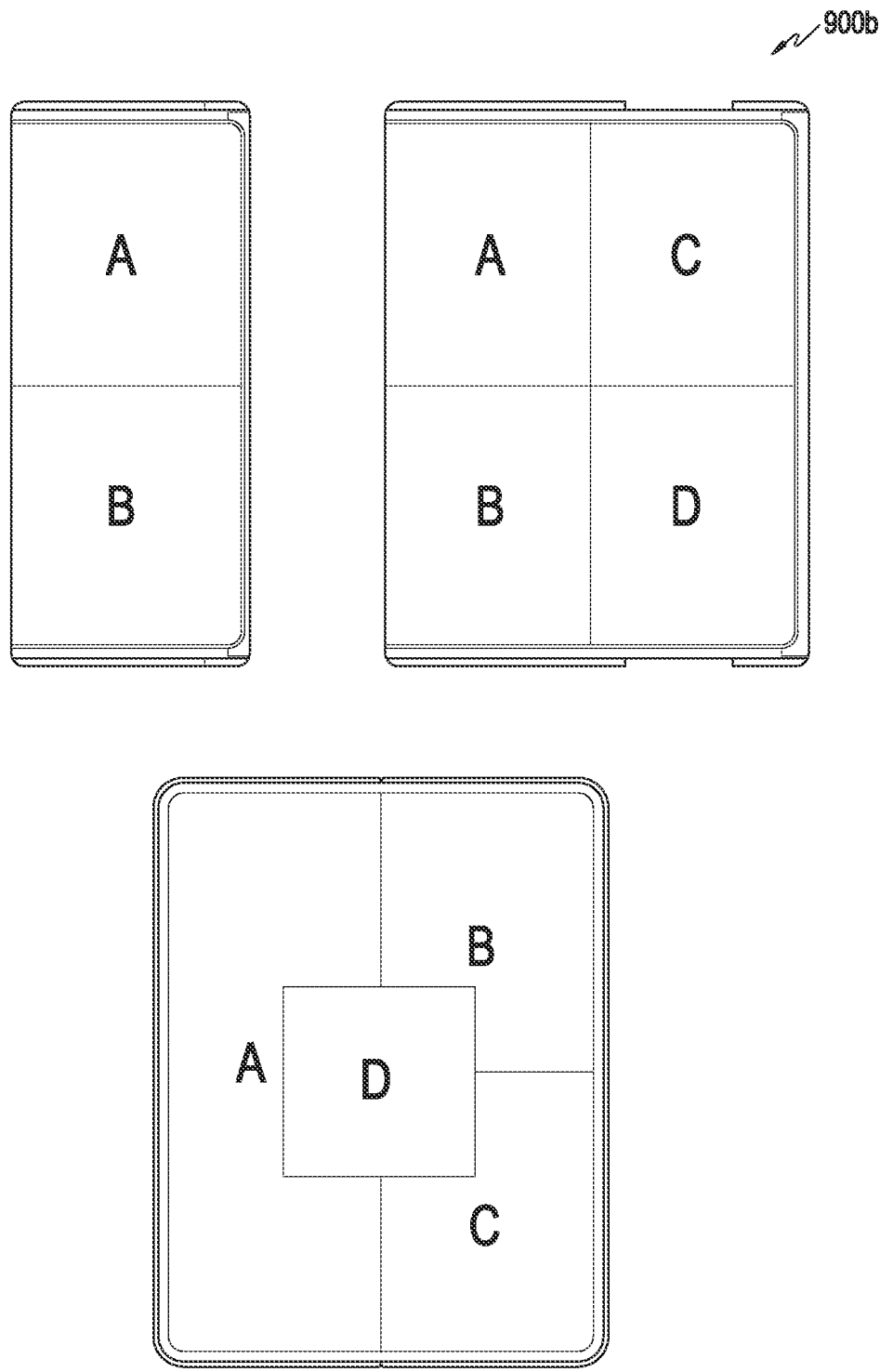

FIGS. 9A and 9B are diagrams illustrating display of multiple applications in an electronic device according to various embodiments of the disclosure.

Referring to FIG. 9A, diagram 900a illustrates that an electronic device 901 (e.g., the electronic device 101 in FIG. 1 and/or the electronic device 401 in FIG. 4) may execute multiple applications, and divide an area of a display 960 (e.g., the display module 160 in FIG. 1 and/or the display 460 in FIG. 4) to display execution of multiple applications 930, 950, and 970. The electronic device 901 may analyze feature information of each of the multiple applications 930, 950, and 970 and determine function objects capable of executing a function through an air gesture among multiple objects included in each application.

Referring to FIG. 9B, diagram 900b an electronic device may divide a display into two areas to display two applications A and B being executed in the two respective areas, and divide a display into four areas to display four applications A, B, C, and D being executed in the four respective areas.

Figure 10A:
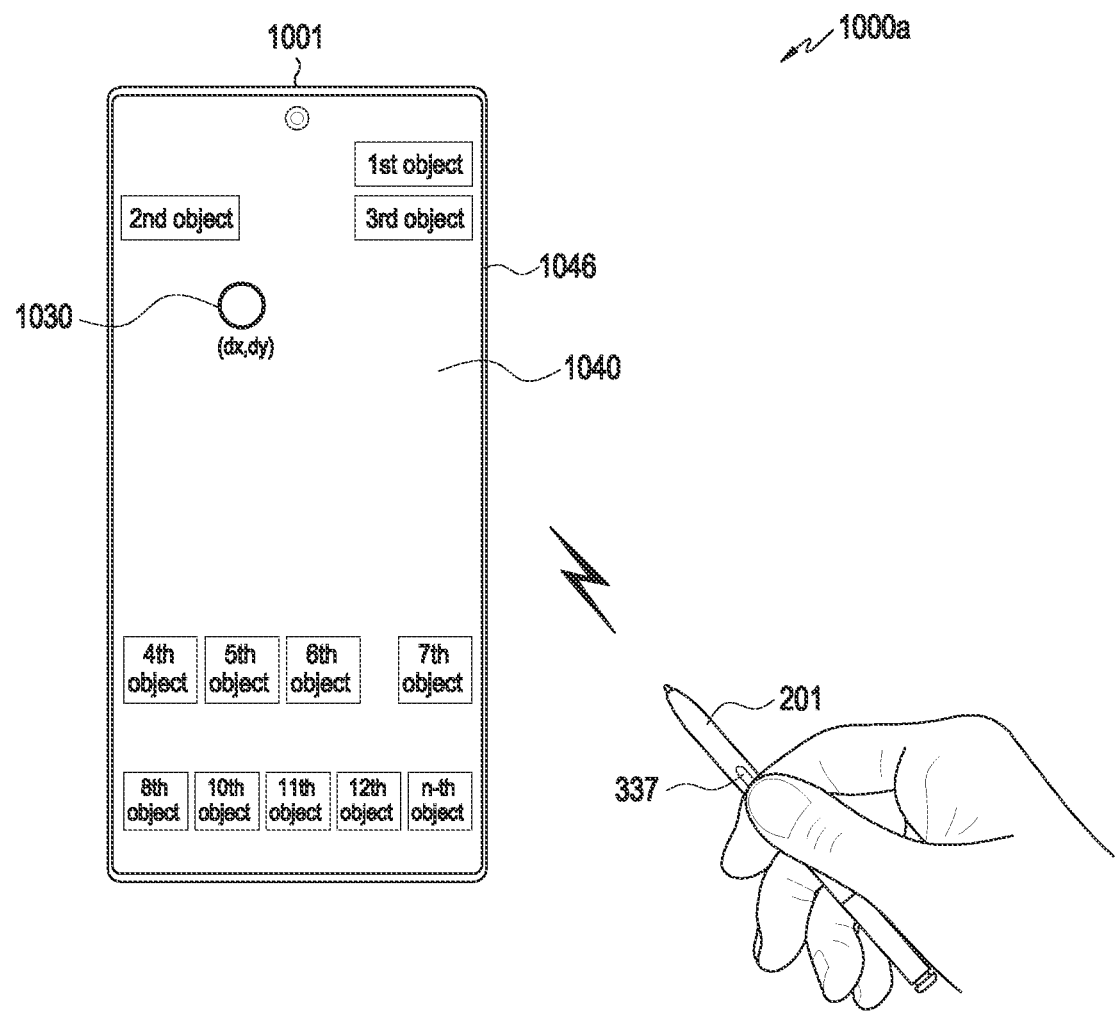
FIGS. 10A, 10B, and 10C are diagrams illustrating execution of a selection event received from a stylus pen in an electronic device according to various embodiments of the disclosure.
Figure 10B:
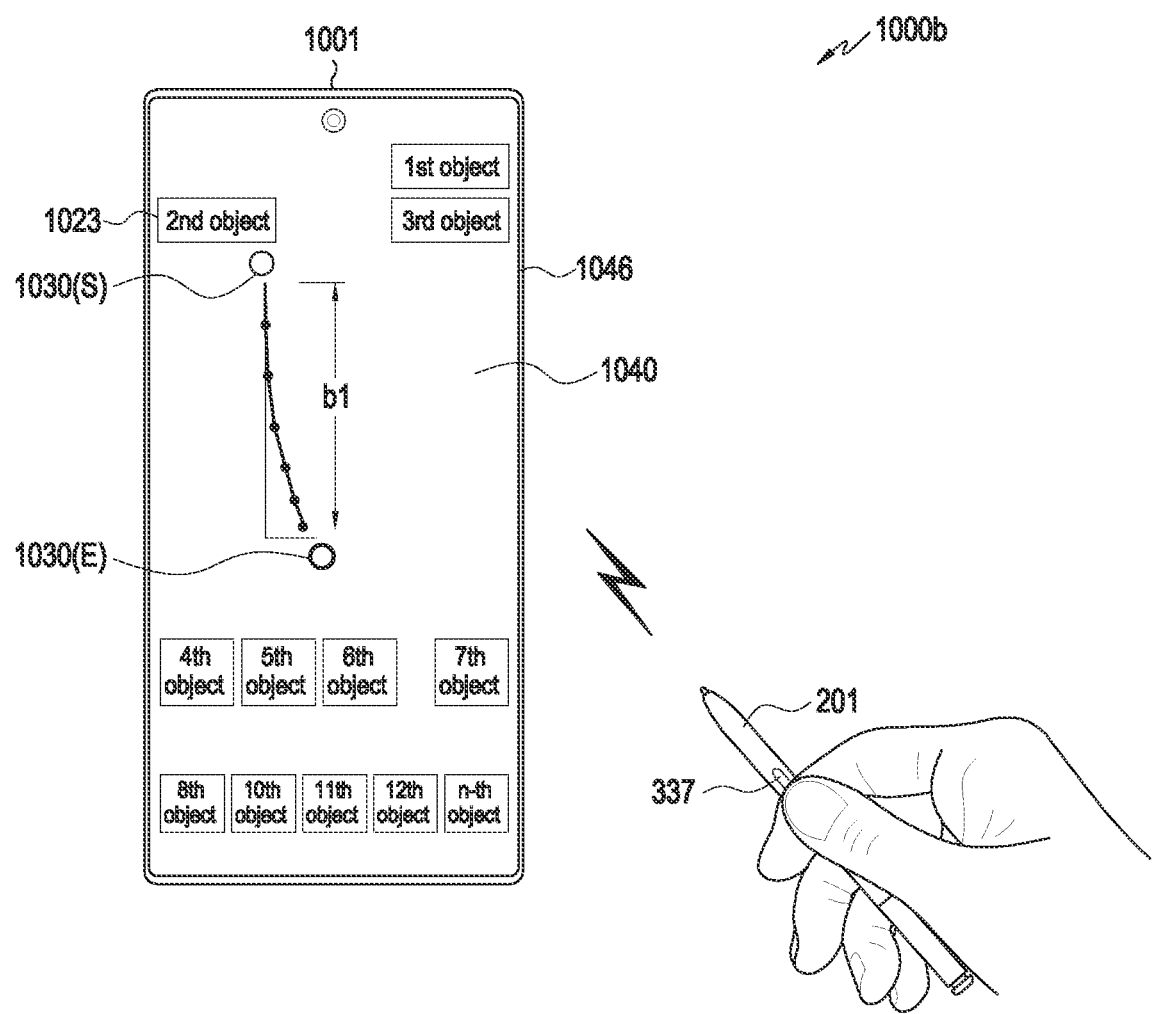
Figure 10C:
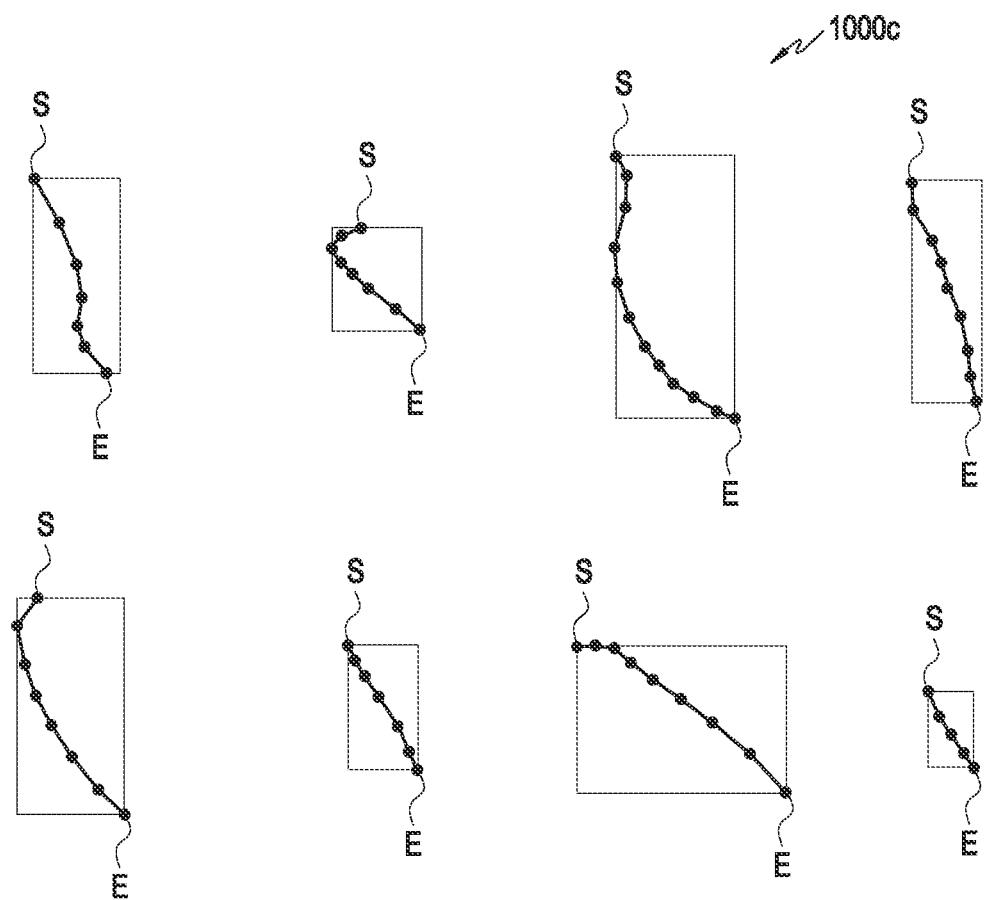

FIGS. 10A, 10B, and 10C are diagrams illustrating execution of a selection event received from a stylus pen in an electronic device according to various embodiments of the disclosure.

Referring to FIG. 10A, diagram 1000a illustrates that an electronic device 1001 (e.g., the electronic device 101 in FIG. 1 and/or the electronic device 401 in FIG. 4) is connected to the stylus pen 201 (e.g., the stylus pen 201 in FIGS. 2, 3A, and 3B) via communication in a short-range communication method (e.g., BLE communication), and while displaying a first application 1040 being executed on a display 1046 (e.g., the display module in FIG. 1 and/or the display 460 in FIG. 4), may display an air pointer 1030 on the display 1046 to correspond to the movement of the stylus pen 201. According to an embodiment, the electronic device 1001 may identify occurrence of an air pointer initiation event, and display the air pointer 1030 on the display 1046 to correspond to the movement of the stylus pen 201. For example, the electronic device 1001 may detect an event of pushing a button for a predetermined time or longer from the stylus pen 201, thereby identifying occurrence of an initiation event of the air pointer. As another example, the electronic device 1001 may detect a pre-designated gesture from the stylus pen 201, thereby identifying occurrence of an initiation event of the air pointer. As yet another example, the electronic device 1001 may select an air pointer-related object displayed on the display 1046 of the electronic device 1001, thereby identifying occurrence of an initiation event of the air pointer.

Referring to FIG. 10B, diagram 1000b illustrates that, in a state where the air pointer 1030 is positioned in an area of a function object 1023 (a 2nd object) among function objects (e.g., a 1st object, the 2nd object, a 3rd object, a 4th object, a 5th object, a 6th object, a 7th object, an 8th object, a 9th object, a 10th object, an 11th object, a 12th object, and an n-th object) capable of executing a function through an air gesture in the first application 1040, the electronic device 1001 (e.g., the electronic device 101 in FIG. 1 and/or the electronic device 401 in FIG. 4) may receive a selection event corresponding to an operation of pressing the button 337 included in the stylus pen 201 and a press releasing operation from the stylus pen.

The electronic device 101 may calculate and store first position information S (dx, dy) (e.g., 1030(S) of FIG. 10B) of the air pointer positioned on the display 1046 at a time point of pressing the button 337 included in the stylus pen. The electronic device 1001 may calculate and store second position information E (dx1, dy1) (e.g., 1030(E) of FIG. 10B) of the air pointer 1030 positioned on the display 1046 at a time point of releasing the press of the button 337 included in the stylus pen 201, that is, a time point at which the air pointer 1030 is stopped after moving a movement b 1 downwards according to a downward movement of the stylus pen 201 caused by the press of the button 337 included in the stylus pen. The electronic device 1001 may store pattern information of the stylus pen according to the movement b 1 of the stylus pen 201 from a time point of storing the first position information S to a time point of storing the second position information E. When a shape of a movement trajectory allowing recognition that the stylus pen 201 has shaken due to a press of the button 337 included in the stylus pen 201 is identified based on pattern information of the stylus pen, the electronic device 1001 may identify selection of the function object corresponding to the selection event. The electronic device 1001 may determine, as position information intended by a user, the first position information S (dx, dy) among the first position information S (dx, dy) of the air pointer 1030 and the second position information E (dx1, dy1) of the air pointer 1030, and control the function object 1023 (the 2nd object) configured in an area including the first position information, to perform a function corresponding to the selection event.

Referring to FIG. 10C, diagram 1000c illustrates various embodiments showing first position information S (dx, dy) of the air pointer positioned on the display at a time point of pressing the button 337 included in the stylus pen 201, and second position information E (dx1, dy1) of the air pointer 1030 positioned on the display at a time point of releasing the press of the button 337 included in the stylus pen 201 according to the movement of the stylus pen 201.

Figure 11A:
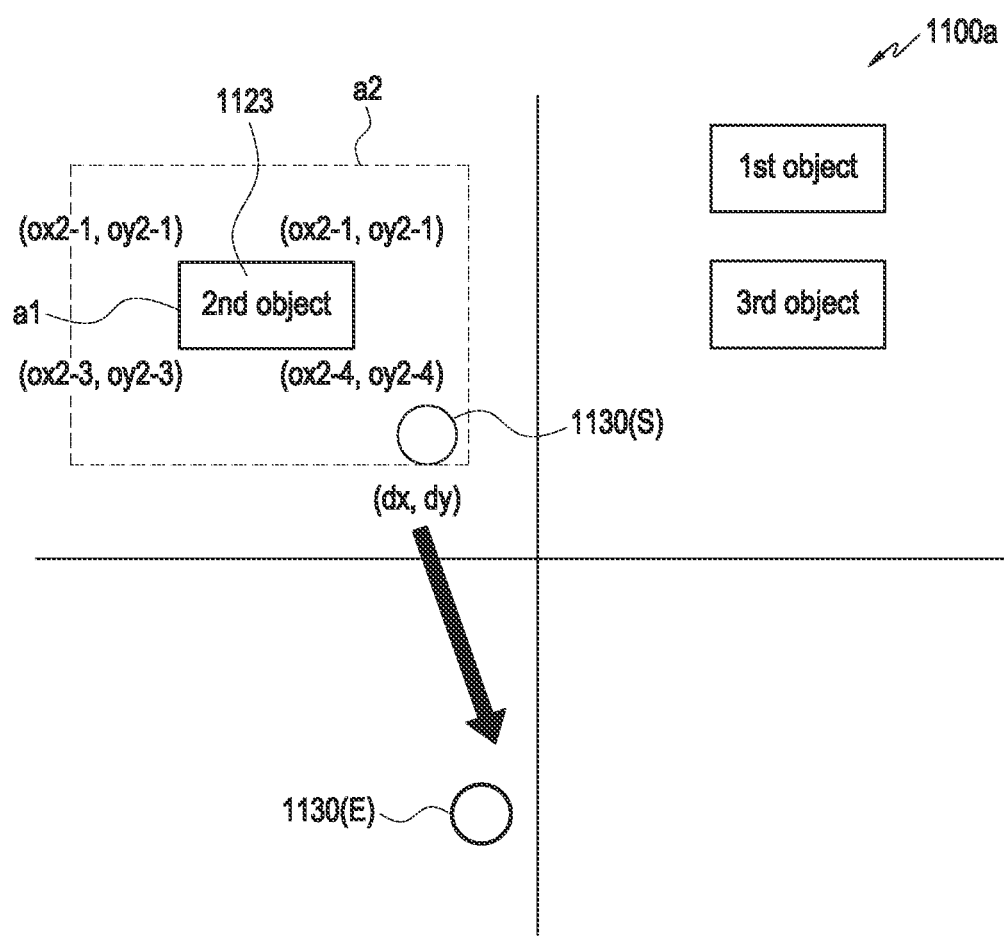
FIGS. 11A and 11B are diagrams illustrating selection of a function object in an electronic device according to various embodiments of the disclosure.
Figure 11B:
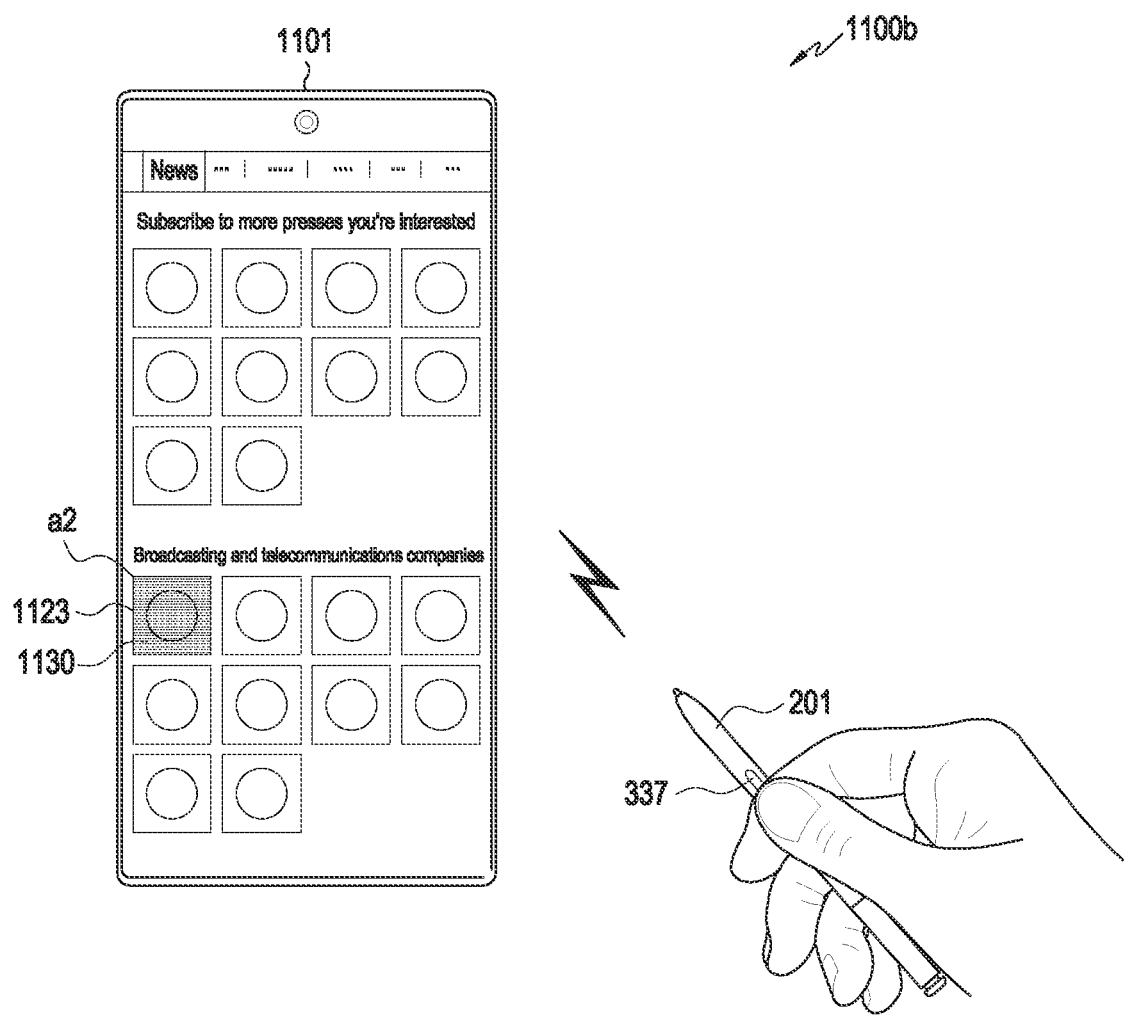

FIGS. 11A and 11B are diagrams illustrating selection of a function object in an electronic device according to various embodiments of the disclosure.

Referring to FIG. 11A, diagram 1100a illustrates that, in relation to an electronic device 1101 (e.g., the electronic device 101 in FIG. 1 and/or the electronic device 401 in FIG. 4), function objects, included in an application, capable of executing a function through an air gesture may include an area obtained by expanding an area pre-configured in the application by a predetermined area. For example, a function object 1123 (a 2nd object) among the function objects (a 1st object, the 2nd object, and a 3rd object), included in the application, capable of executing a function through an air gesture may include an area a2 obtained by expanding an area a1 pre-configured in the application by a predetermined area. In a state where an air pointer 1130 is positioned in the expanded area a2 of the function object 1123 (the 2nd object), when a selection event is received from a stylus pen, the electronic device may calculate first position information S (dx, dy) (e.g., 1130(S) of FIG. 11A) of the air pointer 1130 positioned on a display at a time point of pressing a button included in the stylus pen, and second position information E (dx1, dy1) (e.g., 1130(E) of FIG. 11A) of the air pointer 1130 positioned on the display at a time point of releasing the press of the button included in the stylus pen, and may control, to perform a function corresponding to the selection event, the function object 1123 (the 2nd object) configured in the area a2 including the first position information S (dx, dy) among the first position information S (dx, dy) of the air pointer 1130 and the second position information E (dx1, dy1) of the air pointer 1130.

Referring to FIG. 11B, diagram 1100b illustrates that the electronic device 1101 (e.g., the electronic device 101 in FIG. 1 and/or the electronic device 401 in FIG. 4) may display the expanded area a2 of a function object including the air pointer 1130 among function objects, included in an application, capable of executing a function through an air gesture, to be distinguished from expanded areas of the other function objects and may, for example, highlight and display the expanded area of the function object including the air pointer 1130.

According to various embodiments, an electronic device (e.g., the electronic device 101 in FIG. 1 or the electronic device (e.g., the stylus pen 201) in FIGS. 2, 3A, and 3B) may include a display (e.g., the display module 160 in FIG. 1 or the display 460 in FIG. 4) and a processor (e.g., the processor 120 in FIG. 1 or the processor 420 in FIG. 4), wherein the processor is configured to identify an air pointer initiation event of a stylus pen (e.g., the stylus pen 201 in FIGS. 2, 3A, and 3B), display an air pointer of the stylus pen on a display, based on rotation information of the display and information of at least one application being executed in the electric device, identify first position information among multiple pieces of position information for the air pointer, which are calculated according to an operation of a selection event, in case that the selection event is received from the stylus pen, and identify a function object configured in an area including the first position information on the display, based on the information of the at least one application being executed in the electric device, and perform a function of the function object corresponding to the selection event.

According to various embodiments, the processor may be configured to be able to identify occurrence of the air pointer initiation event of the stylus pen after the electronic device and the stylus pen are connected via short-range communication.

According to various embodiments, rotation information of the display may include horizontal rotation information of the display or vertical rotation information of the display.

According to various embodiments, the processor may be configured to, in case that horizontal rotation information of the display is identified in the rotation information of the display, display the air pointer on the display while calculating a movement distance of the air pointer through multiplication of, by a fixed constant value, a horizontal distance value among movement distance values of the air pointer corresponding to a movement distance of the stylus pen, and in case that vertical rotation information of the display is identified in the rotation information of the display, display the air pointer on the display while calculating a movement distance of the air pointer through multiplication of, by a fixed constant value, a vertical distance value among movement distance values of the air pointer corresponding to a movement distance of the stylus pen.

According to various embodiments, in the electronic device, the information of the at least one application being executed includes type information of the application and information of the function object capable of function execution.

According to various embodiments, the processor may be configured to identify whether an area in which the air pointer of the stylus pen is positioned is an area of the function object capable of function execution, based on the information of the at least one application being executed, and in case that the area in which the air pointer of the stylus pen is positioned is identified as the area of the function object, display the area of the function object to be distinguished from other areas.

According to various embodiments, the selection event may occur due to an operation of pressing a button included in the stylus pen and a press releasing operation.

According to various embodiments, the multiple pieces of position information may include first position information of the air pointer in case that the selection event is started and second position information of the air pointer in case that the selection event is terminated.

According to various embodiments, the processor may be configured to identify whether the area including the first position information is an area of the function object capable of function execution, based on the information of the at least one application being executed.

According to various embodiments, the area of the function object may include an area obtained by expanding an area pre-configured in the application by a predetermined area.

Figure 12:
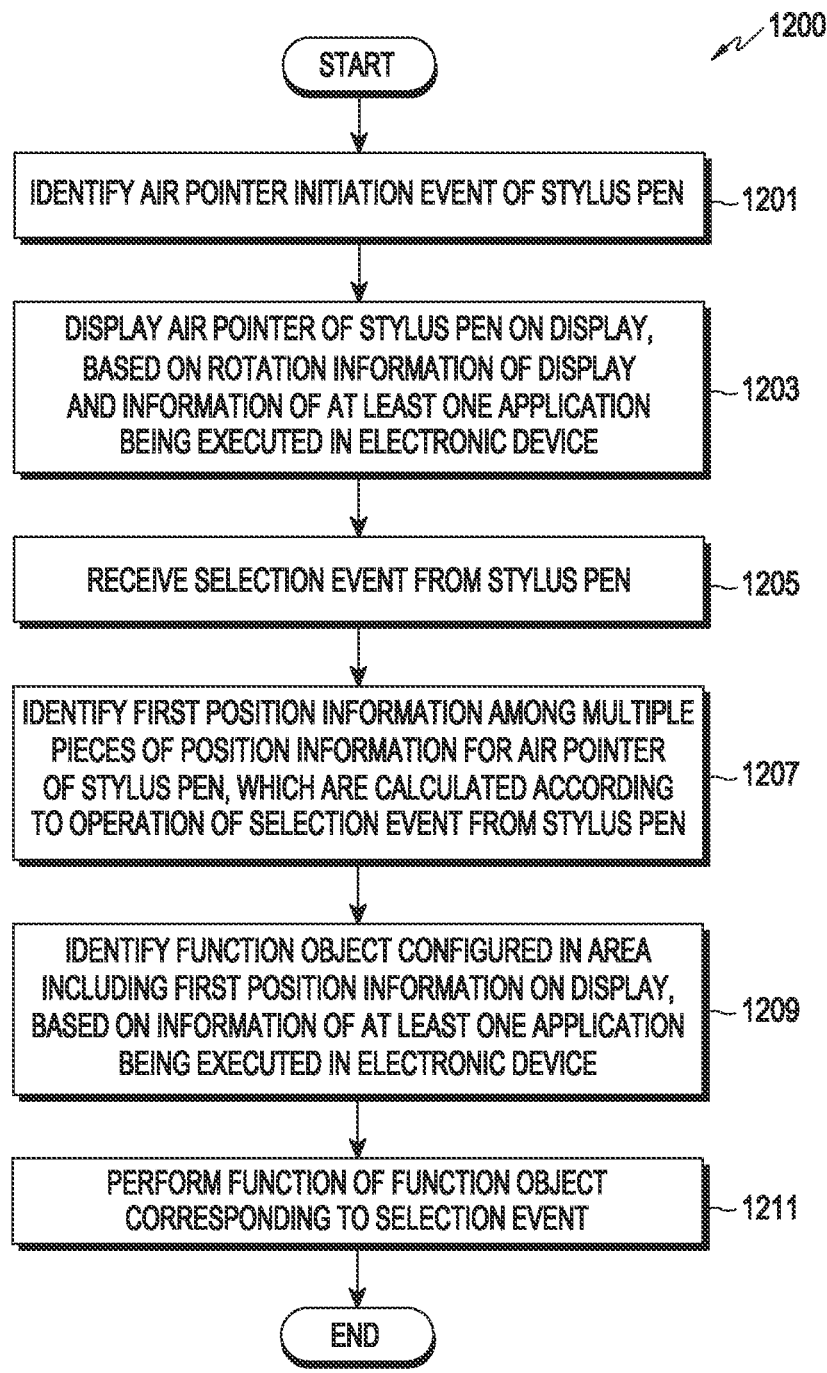
FIG. 12 is a flowchart illustrating an operation of controlling an air pointer of a stylus pen in an electronic device according to an embodiment of the disclosure.

FIG. 12 is a flowchart illustrating an operation of controlling an air pointer of a stylus pen in an electronic device according to an embodiment of the disclosure.

Referring to FIG. 12, flowchart 1200 illustrates that the operation of controlling an air pointer may include operations 1201, 1203, 1205, 1207, 1209, and 1211. According to an embodiment, at least one of operations 1201, 1203, 1205, 1207, 1209, and 1211 may be omitted, the order of some operations may be changed, or a different operation may be added.

In operation 1201, an electronic device (e.g., the electronic device 101 in FIG. 1 or the electronic device 401 in FIG. 4) may identify air pointer initiation of a stylus pen (e.g., the stylus pen 201 in FIGS. 2, 3A, and 3B).

According to an embodiment, after short-range communication is established between the electronic device and the stylus pen via a communication module (e.g., the communication module 490 in FIG. 4), when occurrence of an initiation event of an air pointer of the stylus pen is identified, the electronic device may display the air pointer on a display (e.g., the display 460 in FIG. 4). For example, the electronic device may detect an event of pushing a button for a predetermined time or longer from the stylus pen, thereby identifying occurrence of an initiation event of the air pointer. As another example, the electronic device may detect a pre-designated gesture from the stylus pen 201, thereby identifying occurrence of an initiation event of the air pointer. As yet another example, the electronic device may select an air pointer-related object displayed on the display, thereby identifying occurrence of an initiation event of the air pointer.

In operation 1203, an electronic device (e.g., the electronic device 101 in FIG. 1 or the electronic device 401 in FIG. 4) may display an air pointer of a stylus pen (e.g., the stylus pen 201 in FIGS. 2, 3A, and 3B) on a display (e.g., the display module 160 in FIG. 1 and/or the display 460 in FIG. 4), based on display rotation information and information of at least one application being executed in the electronic device.

According to an embodiment, the electronic device may calculate a movement distance of the air pointer moved on the display according to the movement of the stylus pen, based on the display rotation information (e.g., horizontal rotation information or vertical rotation information of the display), and display the air pointer on the display to correspond to the calculated movement distance.

According to an embodiment, based on information (e.g., type information of an application and information of a function object capable of function execution) of at least one application being executed in the electronic device, the electronic device may determine a function object capable of executing a function through an air gesture among multiple objects included in the application. When the air pointer is positioned in an area of a function object among the multiple objects included in the application, the electronic device may display the area of the function object including the air pointer to be distinguished from other areas.

In operation 1205, an electronic device (e.g., the electronic device 101 in FIG. 1 or the electronic device 401 in FIG. 4) may receive a selection event from a stylus pen (e.g., the stylus pen 201 in FIGS. 2, 3A, and 3B).

According to an embodiment, the selection event may include an operation of pressing a button included in the stylus pen and a press releasing operation.

In operation 1207, an electronic device (e.g., the electronic device 101 in FIG. 1 or the electronic device 401 in FIG. 4) may identify first position information among multiple pieces of position information for an air pointer of a stylus pen (e.g., the stylus pen 201 in FIGS. 2, 3A, and 3B), which are calculated according to an operation of a selection event from the stylus pen.

According to an embodiment, the electronic device may calculate and store first position information of the air pointer at a time point of pressing the button included in the stylus pen, that is, when the selection event is started, and second position information of the air pointer at a time point of releasing the press of the button included in the stylus pen, that is, when the selection event is terminated. The electronic device may identify, as position information for performing the selection event, the first position information of the air pointer among the first position information of the air pointer and the second position information of the air pointer.

In operation 1209, an electronic device (e.g., the electronic device 101 in FIG. 1 or the electronic device 401 in FIG. 4) may identify a function object configured in an area including first position information on a display (e.g., the display module 160 in FIG. 1 and/or the display 460 in FIG. 4), based on information of at least one application being executed in the electronic device.

According to an embodiment, the electronic device may identify whether an area including the first position information is an area of the function object capable of function execution, based on information of at least one application being executed in the electronic device.

In operation 1211, an electronic device (e.g., the electronic device 101 in FIG. 1 or the electronic device 401 in FIG. 4) may perform a function of a function object corresponding to a selection event.

According to an embodiment, the electronic device may control the function object to perform a function corresponding to a selection event received from a stylus pen.

Figure 13:
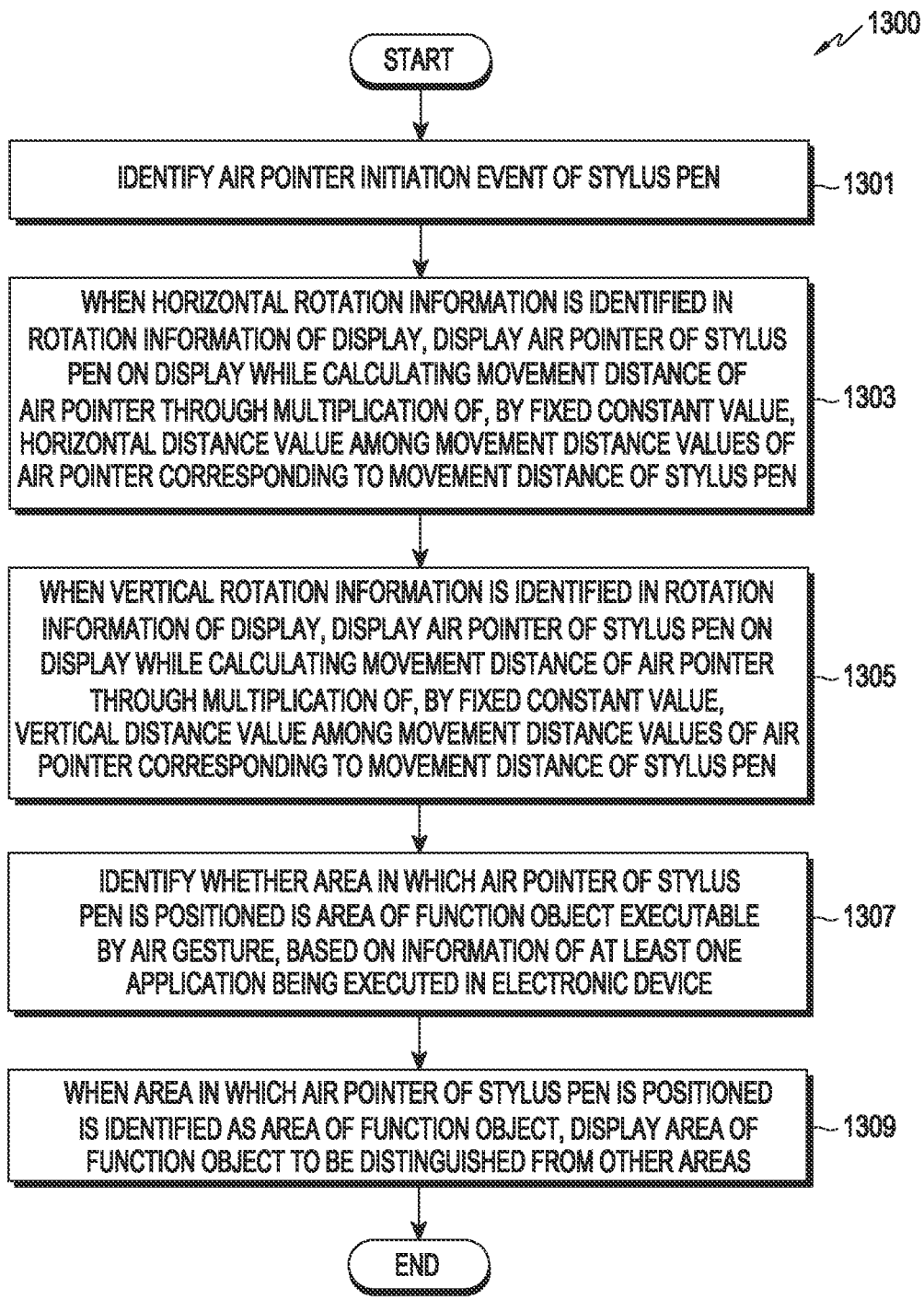
FIG. 13 is a flowchart illustrating an operation of displaying an air pointer of a stylus pen during an operation of controlling the air pointer in an electronic device according to an embodiment of the disclosure.

FIG. 13 is a flowchart illustrating an operation of displaying an air pointer of a stylus pen during an operation of controlling the air pointer in an electronic device according to an embodiment of the disclosure.

Referring to FIG. 13, flowchart 1300 illustrates that the operation of displaying an air pointer may include operations 1301, 1303, 1305, 1307, and 1309. According to an embodiment, at least one of operations 1301, 1303, 1305, 1307, and 1309 may be omitted, the order of some operations may be changed, or a different operation may be added.

In operation 1301, an electronic device (e.g., the electronic device 101 in FIG. 1 or the electronic device 401 in FIG. 4) may identify air pointer initiation of a stylus pen (e.g., the stylus pen 201 in FIGS. 2, 3A, and 3B).

According to an embodiment, after short-range communication is established between the electronic device and the stylus pen via a communication module (e.g., the communication module 490 in FIG. 4), when occurrence of an initiation event of an air pointer of the stylus pen is identified, the electronic device may display the air pointer on a display (e.g., the display 460 in FIG. 4). For example, the electronic device may detect an event of pushing a button for a predetermined time or longer from the stylus pen, thereby identifying occurrence of an initiation event of the air pointer. As another example, the electronic device may detect a pre-designated gesture from the stylus pen 201, thereby identifying occurrence of an initiation event of the air pointer. As yet another example, the electronic device may select an air pointer-related object displayed on the display, thereby identifying occurrence of an initiation event of the air pointer.

In operation 1303, when horizontal rotation information is identified in rotation information of a display, an electronic device (e.g., the electronic device 101 in FIG. 1 or the electronic device 401 in FIG. 4) may display an air pointer of a stylus pen (e.g., the stylus pen 201 in FIGS. 2, 3A, and 3B) on the display (e.g., the display module 160 in FIG. 1 and/or the display 460 in FIG. 4) while calculating a movement distance of the air pointer through multiplication of, by a fixed constant value, a horizontal distance value among movement distance values of the air pointer corresponding to a movement distance of the stylus pen.

According to an embodiment, when horizontal rotation information (e.g., landscape mode) of the display is identified in the rotation information of the display, the electronic device may display the air pointer on the display 460 while calculating a movement distance of the air pointer through multiplication of, by a fixed constant value, a horizontal distance value among movement distance values of the air pointer corresponding to a movement distance of the stylus pen so as to allow easier movement of the air pointer when the air pointer is moved in the horizontal direction on the display.

In operation 1305, when vertical rotation information is identified in rotation information of a display, an electronic device (e.g., the electronic device 101 in FIG. 1 or the electronic device 401 in FIG. 4) may display an air pointer of a stylus pen (e.g., the stylus pen 201 in FIGS. 2, 3A, and 3B) on the display (e.g., the display module 160 in FIG. 1 and/or the display 460 in FIG. 4) while calculating a movement distance of the air pointer through multiplication of, by a fixed constant value, a vertical distance value among movement distance values of the air pointer corresponding to a movement distance of the stylus pen.

According to an embodiment, when vertical rotation information (e.g., portrait mode) of the display is identified in the rotation information of the display, the electronic device may display the air pointer on the display 460 while calculating a movement distance of the air pointer through multiplication of, by a fixed constant value, a vertical distance value among movement distance values of the air pointer corresponding to a movement distance of the stylus pen so as to allow easier movement of the air pointer when the air pointer is moved in the vertical direction on the display.

In operation 1307, an electronic device (e.g., the electronic device 101 in FIG. 1 or the electronic device 401 in FIG. 4) may identify whether an area in which an air pointer of a stylus pen (e.g., the stylus pen 201 in FIGS. 2, 3A, and 3B) is positioned is an area of a function object executable by an air gesture, based on information of at least one application being executed in the electronic device.

According to an embodiment, the electronic device may identify, based on information of at least one application being executed in the electronic device, that an area in which an air pointer is positioned on a display (e.g., the display module 160 in FIG. 1 and/or the display 460 in FIG. 4)

displaying the application being executed is an area of a function object capable of function execution.

In operation 1309, when an area in which an air pointer of a stylus pen is positioned is identified as an area of a function object, an electronic device (e.g., the electronic device 101 in FIG. 1 or the electronic device 401 in FIG. 4) may display the area of the function object to be distinguished from other areas.

According to an embodiment, the electronic device may display the area of the function object, in which the air pointer is positioned on a display (e.g., the display module 160 in FIG. 1 and/or the display 460 in FIG. 4), to be distinguished from other areas so that a user is able to easily recognize that the air pointer has moved to a desired position.

Figure 14:
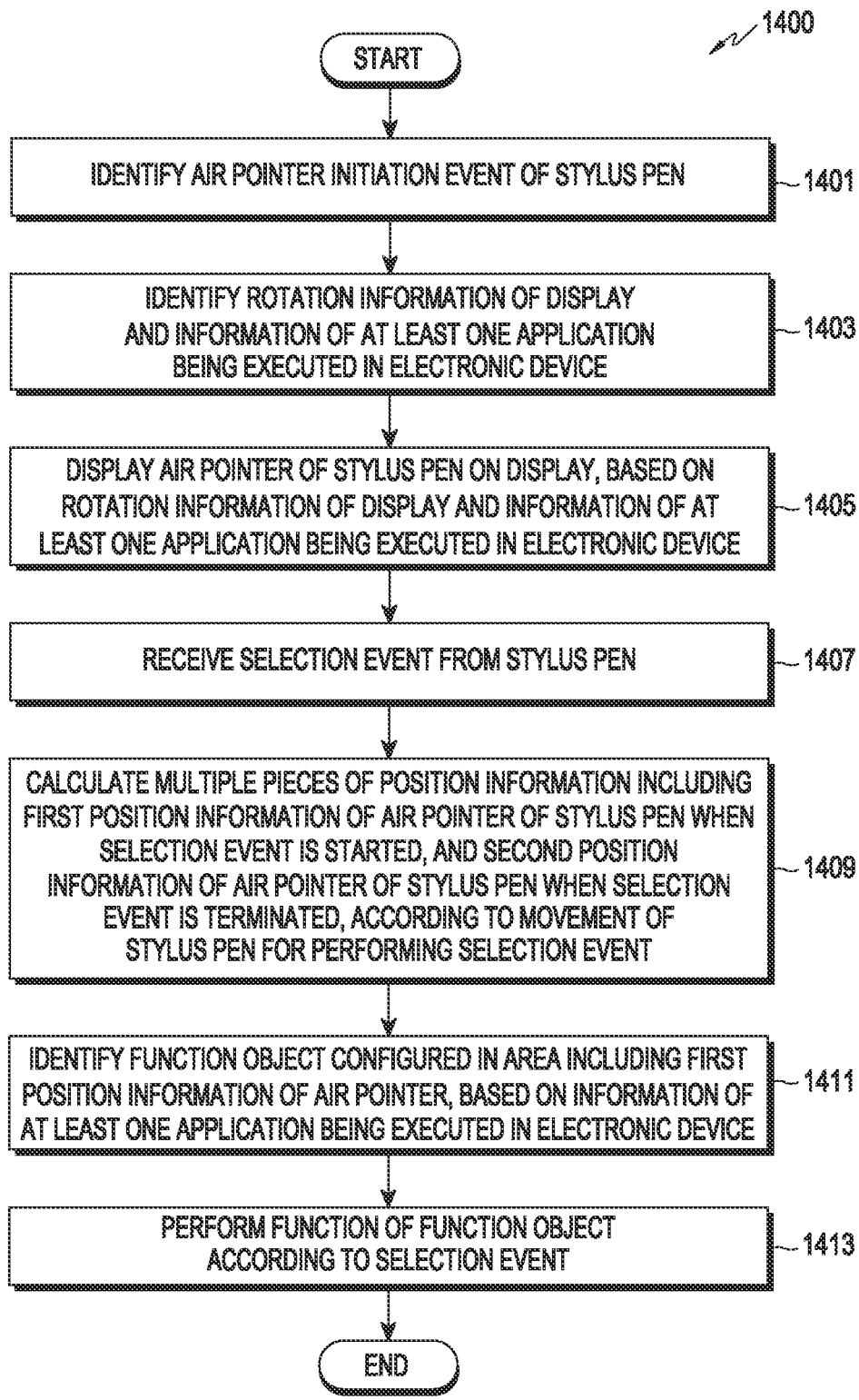
FIG. 14 is a flowchart illustrating an operation for executing a function object on which an air pointer of a stylus pen is positioned, in an operation of controlling the air pointer in an electronic device according to an embodiment of the disclosure.

FIG. 14 is a flowchart illustrating an operation for executing a function object on which an air pointer of a stylus pen is positioned, in an operation of controlling the air pointer in an electronic device according to an embodiment of the disclosure.

Referring to FIG. 14, flowchart 1400 illustrates that the operation of executing a function object on which an air pointer is positioned may include operations 1401, 1403, 1405, 1407, 1409, 1411, and 1413. According to an embodiment, at least one of operations 1401, 1403, 1405, 1407, 1409, 1411, and 1413 may be omitted, the order of some operations may be changed, or a different operation may be added.

In operation 1401, an electronic device (e.g., the electronic device 101 in FIG. 1 or the electronic device 401 in FIG. 4) may identify air pointer initiation of a stylus pen (e.g., the stylus pen 201 in FIGS. 2, 3A, and 3B).

According to an embodiment, after short-range communication is established between the electronic device and the stylus pen via a communication module (e.g., the communication module 490 in FIG. 4), when occurrence of an initiation event of an air pointer of the stylus pen is identified, the electronic device may display the air pointer on a display (e.g., the display 460 in FIG. 4). For example, the electronic device may detect an event of pushing a button for a predetermined time or longer from the stylus pen, thereby identifying occurrence of an initiation event of the air pointer. As another example, the electronic device may detect a pre-designated gesture from the stylus pen 201, thereby identifying occurrence of an initiation event of the air pointer. As yet another example, the electronic device may select an air pointer-related object displayed on the display, thereby identifying occurrence of an initiation event of the air pointer.

In operation 1403, an electronic device (e.g., the electronic device 101 in FIG. 1 or the electronic device 401 in FIG. 4) may identify rotation information of a display and information of at least one application being executed in the electronic device.

According to an embodiment, the rotation information of the display may include horizontal rotation information of the display or vertical rotation information of the display.

According to an embodiment, the information of at least one application being executed in the electronic device may include type information of the application and information of a function object capable of function execution. The function object indicates an object capable of executing a function through an air gesture of a stylus pen among multiple objects included in the application, and may include, for example, a button, an input field, a slide button, or a URL link.

In operation 1405, an electronic device (e.g., the electronic device 101 in FIG. 1 or the electronic device 401 in FIG. 4) may display an air pointer of a stylus pen (e.g., the stylus pen 201 in FIGS. 2, 3A, and 3B) on a display (e.g., the display module 160 in FIG. 1 and/or the display 460 in FIG. 4), based on rotation information of the display and information of at least one application being executed in the electronic device.

According to an embodiment, the electronic device may display the air pointer on the display while calculating a movement distance of the air pointer through multiplication of, by a fixed constant value, a horizontal distance value or a vertical distance value among movement distance values of the air pointer corresponding to a movement distance of the stylus pen, based on the rotation information of the display.

According to an embodiment, when it is identified, based on information of at least one application being executed in the electronic device, that an area in which the air pointer is positioned on the display displaying the application being executed is an area of a function object capable of function execution, the electronic device may display the area of the function object, in which the air pointer is positioned, to be distinguished from the other areas.

In operation 1407, an electronic device (e.g., the electronic device 101 in FIG. 1 or the electronic device 401 in FIG. 4) may receive a selection event from a stylus pen (e.g., the stylus pen 201 in FIGS. 2, 3A, and 3B).

According to an embodiment, the electronic device may receive the selection event which has occurred due to an operation of pressing a button included in the stylus pen and a button press releasing operation.

In operation 1409, an electronic device (e.g., the electronic device 101 in FIG. 1 or the electronic device 401 in FIG. 4) may calculate multiple pieces of position information including first position information of an air pointer of a stylus pen when a selection event is started, and second position information of the air pointer of the stylus pen when the selection event is terminated, according to a movement of a stylus pen (e.g., the stylus pen 201 in FIGS. 2, 3A, and 3B) for performing the selection event.

According to an embodiment, the electronic device may calculate and store position information (e.g., coordinate information) of an air pointer of the stylus pen on a display when the selection event is received. The electronic device may calculate and store first position information of the air pointer at a time point of pressing the button included in the stylus pen, that is, when the selection event is started, and second position information of the air pointer at a time point of releasing the press of the button included in the stylus pen, that is, when the selection event is terminated.

In operation 1411, an electronic device (e.g., the electronic device 101 in FIG. 1 or the electronic device 401 in FIG. 4) may identify a function object configured in an area including first position information of an air pointer, based on information of at least one application being executed in the electronic device.

According to an embodiment, the electronic device may identify, as information of a position at which the selection event is to be performed, the first position information of the air pointer when the selection event is started among the first position information of the air pointer and the second position information of the air pointer when the selection event is terminated.

According to an embodiment, when the electronic device identifies, based on the information of the at least one application being executed in the electronic device, whether an area including the first position information is an area of the function object capable of function execution, the area including the first position information may include an expanded area of the function object, which is obtained by expanding an area pre-configured in the application by a predetermined area.

In operation 1413, an electronic device (e.g., the electronic device 101 in FIG. 1 or the electronic device 401 in FIG. 4) may perform a function of a function object according to a selection event.

According to an embodiment, the electronic device may control the function object to perform a function corresponding to a selection event received from a stylus pen (e.g., the stylus pen 201 in FIGS. 2, 3A, and 3B).

According to various embodiments, a method of controlling an air pointer of a stylus pen in an electronic device may include identifying an air pointer initiation event of a stylus pen, displaying an air pointer of the stylus pen on a display, based on rotation information of the display and information of at least one application being executed in the electric device, identifying first position information among multiple pieces of position information for the air pointer, which are calculated according to an operation of a selection event, in case that the selection event is received from the stylus pen, identifying a function object configured in an area including the first position information on the display, based on the information of the at least one application being executed in the electric device, and performing a function of the function object corresponding to the selection event.

According to various embodiments, the identifying of the air pointer initiation event may include identifying occurrence of the air pointer initiation event of the stylus pen after the electronic device and the stylus pen are connected via short-range communication.

According to various embodiments, rotation information of the display may include horizontal rotation information of the display or vertical rotation information of the display.

According to various embodiments, the displaying of the air pointer may include, in case that horizontal rotation information of the display is identified in the rotation information of the display, displaying the air pointer on the display while calculating a movement distance of the air pointer through multiplication of, by a fixed constant value, a horizontal distance value among movement distance values of the air pointer corresponding to a movement distance of the stylus pen, and in case that vertical rotation information of the display is identified in the rotation information of the display, displaying the air pointer on the display while calculating a movement distance of the air pointer through multiplication of, by a fixed constant value, a vertical distance value among movement distance values of the air pointer corresponding to a movement distance of the stylus pen.

According to various embodiments, the information of the at least one application being executed may include type information of the application and information of the function object capable of function execution.

According to various embodiments, the displaying of the air pointer may include identifying whether an area in which the air pointer of the stylus pen is positioned is an area of the function object capable of function execution, based on the information of the at least one application being executed, and in case that the area in which the air pointer of the stylus pen is positioned is identified as the area of the function object, displaying the area of the function object to be distinguished from other areas.

According to various embodiments, the selection event may occur due to an operation of pressing a button included in the stylus pen and a press releasing operation.

According to various embodiments, the multiple pieces of position information may include first position information of the air pointer in case that the selection event is started and second position information of the air pointer in case that the selection event is terminated.

According to various embodiments, the identifying of the function object may include a method including identifying whether the area including the first position information is an area of the function object capable of function execution, based on the information of the at least one application being executed.

According to various embodiments, the area of the function object may include an area obtained by expanding an area pre-configured in the application by a predetermined area.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2'," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a processor; and
    memory storing instructions that, when executed by the processor, cause the electronic device to:
        identify an air pointer initiation event of a stylus pen,
        based on rotation information of the display and information of at least one application being executed in the electronic device, display, on the display, an air pointer of the stylus pen,
        in case a selection event is received from the stylus pen, identify first position information among multiple pieces of position information for the air pointer, the multiple pieces of position information being calculated sequentially in time according to an operation of the selection event,
        based on the information of the at least one application being executed in the electronic device, identify a function object configured in an area including the first position information on the display, and
        perform a function of the function object corresponding to the selection event.

2. The electronic device of claim 1, wherein the instructions, when executed by the processor, cause the electronic device to:
    identify an occurrence of the air pointer initiation event of the stylus pen after the electronic device and the stylus pen are connected via short-range communication.

3. The electronic device of claim 1, wherein the instructions, when executed by the processor, cause the electronic device to:
    in case horizontal rotation information of the display is identified in the rotation information of the display, display, on the display, the air pointer while calculating a movement distance of the air pointer through multiplication of, by a first fixed constant value, a horizontal distance value among movement distance values of the air pointer corresponding to a movement distance of the stylus pen, and
    in case vertical rotation information of the display is identified in the rotation information of the display, display, on the display, the air pointer while calculating the movement distance of the air pointer through multiplication of, by a second fixed constant value, a vertical distance value among the movement distance values of the air pointer corresponding to the movement distance of the stylus pen.

4. The electronic device of claim 1, wherein the information of the at least one application being executed comprises type information of the application and information of the function object capable of executing the function.

5. The electronic device of claim 1, wherein the instructions, when executed by the processor, cause the electronic device to:
    based on the information of the at least one application being executed, identify whether an area in which the air pointer of the stylus pen is positioned is an area of the function object capable of executing the function, and
    in case the area in which the air pointer of the stylus pen is positioned is identified as the area of the function object, display, on the display, the area of the function object to be distinguished from other areas.

6. The electronic device of claim 1, wherein the selection event comprises an operation of pressing a button included in the stylus pen and a press releasing operation.

7. The electronic device of claim 1,
    wherein, in case the selection event starts, the multiple pieces of position information comprise the first position information of the air pointer, and
    wherein, in case the selection event terminates, the multiple pieces of position information comprise second position information of the air pointer.

8. The electronic device of claim 1,
    wherein the instructions, when executed by the processor, cause the electronic device to:
        based on the information of the at least one application being executed, identify whether the area including the first position information is an area of the function object capable of executing the function, and wherein the area of the function object comprises an area obtained by expanding a predetermined area pre-configured in the application.

9. A method of controlling an air pointer of a stylus pen in an electronic device, the method comprising:
- identifying an air pointer initiation event of the stylus pen;
- based on rotation information of a display and information of at least one application being executed in the electric device, displaying, on the display, the air pointer of the stylus pen;
- in case a selection event is received from the stylus pen, identifying first position information among multiple pieces of position information for the air pointer, the multiple pieces of position information being calculated sequentially in time according to an operation of the selection event;
- based on the information of the at least one application being executed in the electric device, identifying a function object configured in an area including the first position information on the display; and
- performing a function of the function object corresponding to the selection event.

10. The method of claim 9, wherein the displaying of the air pointer comprises:
- in case horizontal rotation information of the display is identified in the rotation information of the display, displaying, on the display, the air pointer while calculating a movement distance of the air pointer through multiplication of, by a first fixed constant value, a horizontal distance value among movement distance values of the air pointer corresponding to a movement distance of the stylus pen; and
- in case vertical rotation information of the display is identified in the rotation information of the display, displaying, on the display, the air pointer while calculating the movement distance of the air pointer through multiplication of, by a second fixed constant value, a vertical distance value among the movement distance values of the air pointer corresponding to the movement distance of the stylus pen.

11. The method of claim 9, wherein the information of the at least one application being executed comprises type information of the application and information of the function object capable of executing the function.

12. The method of claim 9, wherein the displaying of the air pointer comprises:
- based on the information of the at least one application being executed, identifying whether an area in which the air pointer of the stylus pen is positioned is an area of the function object capable of executing the function; and
- in case the area in which the air pointer of the stylus pen is positioned is identified as the area of the function object, displaying, on the display, the area of the function object to be distinguished from other areas.

13. The method of claim 9, wherein the selection event comprises an operation of pressing a button included in the stylus pen and a press releasing operation.

14. The method of claim 9,
- wherein, in case the selection event starts, the multiple pieces of position information comprise the first position information of the air pointer, and
- wherein, in case the selection event terminates, the multiple pieces of position information comprise second position information of the air pointer.

15. The method of claim 9,
- wherein the identifying of the function object comprises, based on the information of the at least one application being executed, identifying whether the area including the first position information is an area of the function object capable of executing the function, and
- wherein the area of the function object comprises an area obtained by expanding a predetermined area pre-configured in the application.

* * * * *